US012534109B2

(12) United States Patent
McLean et al.

(10) Patent No.: US 12,534,109 B2
(45) Date of Patent: Jan. 27, 2026

(54) AUTONOMOUS URBAN TRANSPORT VEHICLE

(71) Applicant: Ryan McLean, Pasadena, CA (US)

(72) Inventors: Ryan McLean, Pasadena, CA (US); Gregg Luconi, Monrovia, CA (US); William Tod Gross, Pasadena, CA (US); Maximilian Zavodny, Pasadena, CA (US)

(73) Assignee: Ryan McLean, Pasadena, CA (US)

( * ) Notice: Subject to any disclaimer, the term of this patent is extended or adjusted under 35 U.S.C. 154(b) by 1042 days.

(21) Appl. No.: 17/427,363

(22) PCT Filed: Jan. 31, 2020

(86) PCT No.: PCT/US2020/016102
§ 371 (c)(1),
(2) Date: Jul. 30, 2021

(87) PCT Pub. No.: WO2020/160406
PCT Pub. Date: Aug. 6, 2020

(65) Prior Publication Data
US 2022/0017121 A1 Jan. 20, 2022

Related U.S. Application Data

(60) Provisional application No. 62/799,642, filed on Jan. 31, 2019, provisional application No. 62/799,651, (Continued)

(51) Int. Cl.
B60W 60/00 (2020.01)
B60L 8/00 (2006.01)
(Continued)

(52) U.S. Cl.
CPC ....... B60W 60/00253 (2020.02); B60L 8/003 (2013.01); B60L 58/13 (2019.02); B60W 30/18127 (2013.01); B60W 50/082 (2013.01); B60W 50/14 (2013.01); B62K 5/06 (2013.01); G06N 20/00 (2019.01); G06Q 10/20 (2013.01); G06Q 30/0205 (2013.01);
(Continued)

(58) Field of Classification Search
CPC ..... B60W 60/00253; B60W 30/18127; B60W 50/14; G06N 20/00; B60L 58/13; B60L 8/003; G06V 20/593; B62K 5/06
USPC .................................................... 280/47.131
See application file for complete search history.

(56) References Cited

U.S. PATENT DOCUMENTS 5,775,452 A * 7/1998 Patmont ................. B62K 3/002
180/181
5,975,229 A * 11/1999 Hosoda ................... A63C 17/16
180/181

(Continued)

Primary Examiner — Hau V Phan
(74) Attorney, Agent, or Firm — Dierker & Kavanaugh, P.C.

(57) ABSTRACT

An autonomous urban transport vehicle (AUTV) to transport a user, including a tricycle including brakes and steering and a controller. The controller includes an autonomous mode processor to control the brakes and steering when the AUTV is in an autonomous mode. The controller also includes a manual mode processor to control manual mode functions of the AUTV when the AUTV is in a manual mode. The manual mode functions are exclusive of actuation of the brakes and steering.

2 Claims, 31 Drawing Sheets

Related U.S. Application Data filed on Jan. 31, 2019, provisional application No. 62/799,655, filed on Jan. 31, 2019, provisional application No. 62/950,844, filed on Dec. 19, 2019.

(51) Int. Cl.

| | |
|---|---|
| *B60L 58/13* | (2019.01) |
| *B60W 30/18* | (2012.01) |
| *B60W 50/08* | (2020.01) |
| *B60W 50/14* | (2020.01) |
| *B62K 5/06* | (2006.01) |
| *G06N 20/00* | (2019.01) |
| *G06Q 10/20* | (2023.01) |
| *G06Q 30/0204* | (2023.01) |
| *G06Q 30/0226* | (2023.01) |
| *G06Q 30/0283* | (2023.01) |
| *G06Q 50/40* | (2024.01) |
| *G06V 20/59* | (2022.01) |
| *G08G 1/00* | (2006.01) |
| *B60W 50/00* | (2006.01) |

(52) U.S. Cl.
CPC ..... *G06Q 30/0226* (2013.01); *G06Q 30/0284* (2013.01); *G06Q 50/40* (2024.01); *G06V 20/593* (2022.01); *G08G 1/202* (2013.01); *B60W 2050/007* (2013.01); *B60W 2300/367* (2013.01); *B60W 2520/406* (2013.01)

(56) References Cited

U.S. PATENT DOCUMENTS

| | | | |
|---|---|---|---|
| 7,100,728 B2 * | 9/2006 | Huang | B62M 7/00 |
| | | | 180/181 |
| 8,292,315 B1 * | 10/2012 | Pelkonen | B62K 5/06 |
| | | | 280/288.1 |
| 10,419,904 B2 * | 9/2019 | Lee | B62J 45/20 |
| 2010/0044137 A1 * | 2/2010 | Atherton | B62K 3/002 |
| | | | 180/223 |
| 2020/0180721 A1 * | 6/2020 | Bartolotta | B62K 5/00 |
| 2021/0096564 A1 * | 4/2021 | Panigrahi | G08G 1/205 |

* cited by examiner

AUTONOMOUS URBAN TRANSPORT VEHICLE

CROSS-REFERENCE TO RELATED APPLICATIONS

This application is a national stage entry under 35 U.S.C. § 371 of PCT/US2020/016102, filed Jan. 31, 2020, which itself claims the benefit of U.S. provisional application No. 62/799,642, filed Jan. 31, 2019, [to] U.S. provisional application No. 62/799,651, filed Jan. 31, 2019, U.S. provisional application No. 62/799,655, filed Jan. 31, 2019, and U.S. provisional application No. 62/950,844, filed Dec. 19, 2019, which are each hereby incorporated by reference as if fully set forth herein in their entireties.

TECHNICAL FIELD

This disclosure relates to the field of autonomous transport vehicles, and more particularly, to autonomous urban transport vehicles.

BACKGROUND

Electric scooters, in particular 2-wheel scooters with the wheels arranged in tandem, can be procured as short-term rentals in some urban settings. In some cities, such scooters have made significant penetration into the personal transportation market. Although the 2-wheel electric scooters may have popularity with some users, certain drawbacks to use, proliferation, and business models have slowed the adoption of such scooters for personal rental transportation in population centers.

Some 2-wheel scooters have been haphazardly abandoned on sidewalks or in the doorways of buildings at the end of a ride. Injuries and inconvenience have been reported as being caused by unexpected placement of some scooters, or by improper use. Some business models pay a fee to people who recharge the batteries of scooters and place the recharged scooters at certain locations, such as in racks, where the scooters are ready for a next rental. While the cost of the electric energy may be a small fraction of the revenue, the fees paid for charging and relocating the scooters may be more significant.

In some jurisdictions, ordinances have been enacted to regulate the use of electric scooters and per-use rental bicycles. Such ordinances may include speed limits, parking restrictions, prohibition of use in pedestrian zones or sidewalks, and restriction to bicycle paths/lanes.

As such, it would be desirable to have automated urban transport vehicles and related systems that overcome such drawbacks.

SUMMARY

An aspect provided herein includes an autonomous urban transport vehicle (AUTV) to transport a user, comprising: a tricycle including brakes and steering; a controller including: an autonomous mode processor to control the brakes and steering when the AUTV is in an autonomous mode; and a manual mode processor to control manual mode functions of the AUTV when the AUTV is in a manual mode, wherein the manual mode functions are exclusive of actuation of the brakes and steering. In embodiments, the controller further comprises a fare calculator to determine a price for a ride. In embodiments, the controller further comprises an energy management processor to maintain sufficient energy storage in batteries and to schedule recharging activities. In embodiments, the controller reverts to the manual mode processor when the user mounts the AUTV, and reverts to the autonomous mode processor when the user dismounts the AUTV. In embodiments, the AUTV further comprises a set of sensors configured to detect when the user mounts or dismounts the AUTV. In embodiments, the set of sensors comprises an outward-facing camera feeding an image recognition system to determine that the user has entered the AUTV, an inward-facing camera feeding the image recognition system to determine that the user has entered the AUTV, a weight sensor configured to detect force exerted by the user on a seat or floorboard, and/or a pressure sensor for detecting a user's hand.

An aspect provided herein includes an autonomous urban transport vehicle (AUTV) comprising: an autonomous positioning processor for automatically driving the AUTV, when the AUTV is available, from a present location to a better location wherein the AUTV has a higher probability of acquiring a paying passenger at the better location than a present location.

An aspect provided herein includes an autonomous urban transport vehicle (AUTV) system comprising: a fare calculator; and a demand estimator, wherein the AUTV operates the fare calculator in conjunction with the demand estimator to incentivize trips that end near a demand rich area.

An aspect provided herein includes an autonomous urban transport vehicle (AUTV) system comprising a controller to determine a state of compliance with an ordinance of a jurisdiction in which an AUTV is located. In embodiments, the controller is to automatically operate the AUTV or to restrict manual operation of the AUTV according to rules based on the ordinance of the jurisdiction in which the AUTV is located. In embodiments, the ordinance includes a parking ordinance that applies to the AUTV after a completion of a ride. In embodiments, the AUTV system is to notify a driver of a non-compliance with the ordinance.

An aspect provided herein includes an autonomous urban transport vehicle (AUTV) system wherein the AUTV system is to notify a driver of a feature mapped by an other AUTV system. In embodiments, the feature includes a hazard or a congested traffic area.

An aspect provided herein includes an autonomous urban transport vehicle (AUTV) comprising: an articulated frame including: an upper portion having a main beam, a down tube, a seat tube and a head tube rigidly affixed together; a lower portion having a deck and rear wheels attached thereto; wherein the main beam is connected to the lower portion at hinged joints wherein the main beam is rotatable about a tilt axis, wherein the rotation of the main beam about the tilt axis is independent of a camber of the rear wheels, wherein the tilt axis is longitudinal with respect to the AUTV. In embodiments, the head tube is rigidly connected to the down tube, wherein the head tube defines a steering axis, wherein a steerer tube is rotatably disposed in the head tube to rotate about the steering axis, wherein a handlebar is connected to the steerer tube for rotation therewith, wherein the down tube is rigidly affixed to the main beam, wherein the seat tube is rigidly affixed to the main beam, and wherein a seat is attached to the seat tube. In embodiments, the AUTV is a tricycle having a single front wheel and two rear wheels disposed aft of the single front wheel. In embodiments, the single front wheel has a front hub motor disposed in the single front wheel for selectively applying drive torque and regenerative braking to the single front wheel. In embodiments, two rear wheels include a left rear wheel and a right rear wheel, wherein a left hub motor is disposed in the left rear wheel for selectively applying drive torque and regenerative braking to the left rear wheel, and wherein a right hub motor is disposed in the right rear wheel for selectively applying drive torque and regenerative braking to the right rear wheel. In embodiments, the AUTV is a quadricycle having two front wheels and two rear wheels disposed aft of the two front wheels.

In embodiments, the AUTV further comprises: a forward hinge knuckle and a rear hinge knuckle rigidly attached to the lower portion; a forward hinge aperture defined by the forward hinge knuckle; and a rear hinge aperture defined by the rear hinge knuckle, wherein the forward hinge aperture and the rear hinge aperture define the tilt axis. In embodiments, the forward hinge knuckle comprises a forward pillow block bearing assembly and the rear hinge knuckle comprises a rear pillow block bearing assembly. In embodiments, the rear hinge knuckle comprises a rod end bearing. In embodiments, the AUTV further comprises: a forward spindle attached to the main beam at a forward end of the main beam wherein the forward spindle defines the tilt axis; and a rear spindle attached at a rear end of the main beam distal to the forward end of the main beam, wherein the rear spindle defines the tilt axis. In embodiments, the AUTV further comprises a biasing mechanism to urge the upper portion toward a center configuration wherein the AUTV is in the center configuration when the down tube and the seat tube define an upright plane that is normal to a line extending through the rotational centers of the rear wheels. In embodiments, the biasing mechanism includes a spring to urge the upper portion toward the center configuration. In embodiments, the spring is a leaf spring attached to the lower portion, wherein the upper portion includes a left eccentric arm affixed to the main beam to engage the leaf spring and to increasingly energize the leaf spring as a tilt angle increases to the left, wherein the upper portion includes a right eccentric arm affixed to the main beam opposite the left eccentric arm to engage the leaf spring and to increasingly energize the leaf spring as the tilt angle increases to the right, wherein the left eccentric arm is to disengage the leaf spring when the tilt angle is positive to the right, wherein the right eccentric arm is to disengage the leaf spring when the tilt angle is positive to the left. In embodiments, the AUTV further comprises: a left bracket to mount a left end of the leaf spring to the deck; a right bracket to mount a right end of the leaf spring, distal to the left end of the leaf spring, to the deck; and a pin is located through a complementary aperture defined in the leaf spring, wherein the pin is to further engage the left bracket or the right bracket to laterally fix the leaf spring with respect to the deck. In embodiments, the spring is a torsion spring. In embodiments, the spring is a helical spring. In embodiments, the spring is an elastomeric spring. In embodiments, the spring is a Belleville spring.

An aspect provided herein includes an autonomous urban transport vehicle (AUTV) platform for providing mobility through urban neighborhoods. In embodiments, the AUTV platform further comprises a notification system for providing notifications to platform users. In embodiments, the AUTV platform further comprises a mobile application for accessing the platform via a mobile device. In embodiments, the AUTV platform further comprises a communication system for enabling communication between platform entities. In embodiments, the AUTV platform further comprises an application programming interface for enabling access to the platform. In embodiments, the AUTV platform further comprises a software development kit. In embodiments, the AUTV platform further comprises a system for enabling remote control of the AUTV. In embodiments, the AUTV platform further comprises an alerts system for providing alerts to passengers of the AUTV.

An aspect provided herein includes an autonomous urban transport vehicle (AUTV) to provide mobility through urban neighborhoods, comprising: a solar charging system; and an alternative energy system for providing energy to the AUTV. In embodiments, the alternative energy system is an electric charging system. In embodiments, the alternative energy system is of a fuel-based system.

An aspect provided herein includes an autonomous urban transport vehicle (AUTV) to provide mobility through urban neighborhoods, comprising a machine vision system. In embodiments, the machine vision system is to identify a location of the AUTV. In embodiments, the location of the AUTV is indoors. In embodiments, the machine vision system is to identify a user that requested the AUTV. In embodiments, the machine vision system is to identify a user hailing location. In embodiments, the machine vision system is to enable collision avoidance. In embodiments, the machine vision system is to identify businesses or landmarks on a route. In embodiments, the machine vision system is integrated with an advertising system. In embodiments, the AUTV is integrated with an advertising system.

An aspect provided herein includes an autonomous urban transport vehicle (AUTV) to provide mobility through urban neighborhoods, comprising a cargo system for carrying items. In embodiments, the AUTV further comprises a lockable cargo system for securely carrying items. In embodiments, the lockable cargo system includes a remote locking and unlocking system. In embodiments, the lockable cargo system includes a biometrics-based locking and unlocking system. In embodiments, the lockable cargo system has a system for locking and unlocking that is based upon detecting a mobile phone identification number.

An aspect provided herein includes an autonomous urban transport vehicle (AUTV) platform to provide mobility through urban neighborhoods, comprising a system for integrating with a delivery system. In embodiments, the delivery system is to leverage a cargo box of the AUTV.

An aspect provided herein includes an autonomous urban transport vehicle (AUTV) platform to provide mobility through urban neighborhoods, comprising a navigation and routing system integrated with a delivery scheduling and routing system or using information from a delivery scheduling and routing system.

An aspect provided herein includes an autonomous urban transport vehicle (AUTV) platform to provide mobility through urban neighborhoods, comprising a rewards and incentives system for rewarding platform users for a desired behavior. In embodiments, the desired behavior is recharging the AUTV. In embodiments, the rewards and incentives system is to reward platform users for sharing information related to a ride on a social networking system. In embodiments, the rewards and incentives system has a loyalty points system for rewarding users with loyalty points for platform usage-related behavior. In embodiments, the rewards and incentives system is to reward platform users for desired driving behaviors. In embodiments, the desired behavior is a desired passenger behavior. In embodiments, the AUTV platform comprises a probabilistic positioning system for determining a location having a higher probability of acquiring a paying passenger than a present location, wherein the rewards and incentives system is to reward platform users for taking rides on vehicles that are relocating via the probabilistic positioning system.

An aspect provided herein includes an autonomous urban transport vehicle (AUTV) platform to provide mobility through urban neighborhoods, comprising a hailing system for enabling a user to request a vehicle. In embodiments, the hailing system determines a user hailing location by analyzing a photo or video captured by a user device.

An aspect provided herein includes an autonomous urban transport vehicle (AUTV) platform to provide mobility through urban neighborhoods, comprising a scheduling system for enabling a user to schedule the use of a vehicle connected to the platform. In embodiments, the hailing system determines a vehicle location by analyzing a photo or video captured by a user device.

An aspect provided herein includes an autonomous urban transport vehicle (AUTV) platform to provide mobility through urban neighborhoods, comprising a convergence system for determining a rendezvous location for a platform user and a vehicle connected to the platform. In embodiments, the rendezvous location is indoors. In embodiments, the AUTV platform further comprises a machine vision system to determine an indoor position. In embodiments, the rendezvous location is outdoors.

An aspect provided herein includes an autonomous urban transport vehicle (AUTV) platform to provide mobility through urban neighborhoods, comprising a navigation and routing system for configuring vehicle routes. In embodiments, the AUTV routes include an indoor route segment. In embodiments, the AUTV platform has a system for downloading route segment restriction information from a municipal system. In embodiments, the AUTV platform further comprises a system for scheduling downloads of route segment restriction information from a municipal system. In embodiments, the AUTV platform further comprises a system for generating a blacklist for route segments. In embodiments, the AUTV platform further comprises a system for generating a whitelist for route segments.

An aspect provided herein includes an autonomous urban transport vehicle (AUTV) to provide mobility through urban neighborhoods, comprising a navigation system that leverages a machine vision system.

An aspect provided herein includes an autonomous urban transport vehicle (AUTV) platform to provide mobility through urban neighborhoods, comprising a visualization system for providing visualizations related to platform entities. In embodiments, the information related to platform entities is overlaid on a map.

An aspect provided herein includes an autonomous urban transport vehicle (AUTV) platform to provide mobility through urban neighborhoods, comprising a visualization system for providing visualizations related to a progress of a vehicle along a route.

An aspect provided herein includes an autonomous urban transport vehicle (AUTV) platform to provide mobility through urban neighborhoods, comprising a dashboard system for providing analytic overlay information on a map in order to enable a configuration of parameters of a fleet of vehicles.

An aspect provided herein includes an autonomous urban transport vehicle (AUTV) platform to provide mobility through urban neighborhoods, comprising a machine learning or artificial intelligence system for automating decisions. In embodiments, the decisions are related to fleet deployment. In embodiments, the decisions are related to fleet utilization. In embodiments, the decisions are related to fleet positioning.

An aspect provided herein includes an autonomous urban transport vehicle (AUTV) platform to provide mobility through urban neighborhoods, comprising a predictive maintenance system for predicting maintenance events for platform vehicles. In embodiments, the AUTV platform has a maintenance scheduling system for scheduling a maintenance event.

An aspect provided herein includes an autonomous urban transport vehicle (AUTV) platform to provide mobility through urban neighborhoods, comprising an energy management system for managing energy of platform vehicles.

An aspect provided herein includes an autonomous urban transport vehicle (AUTV) to provide mobility through urban neighborhoods, comprising a solar charging system for capturing, storing, and using solar energy. In embodiments, the AUTV platform further has a system for identifying and using roads with direct sunlight on the roads. In embodiments, the AUTV has a system for detecting solar energy information measured by a vehicle. In embodiments, the AUTV platform further has a communication system for enabling communication between platform entities, wherein the communication system is leveraged to share solar energy information measured by vehicles. In embodiments, the AUTV platform having an alternative charging network for providing alternative energy to platform vehicles.

An aspect provided herein includes an autonomous urban transport vehicle (AUTV) platform to provide mobility through urban neighborhoods, comprising a probabilistic positioning system to determine optimal vehicle locations for platform vehicles. In embodiments, the AUTV platform has a system for relocating vehicles to the optimal vehicle locations determined by the probabilistic positioning system.

An aspect provided herein includes an autonomous urban transport vehicle platform to provide mobility through urban neighborhoods, comprising a system for enabling sponsored rides.

An aspect provided herein includes an autonomous urban transport vehicle (AUTV) to provide mobility through urban neighborhoods, comprising a system for locking the AUTV. In embodiments, locking the AUTV initiates a charging mechanism.

An aspect provided herein includes an autonomous urban transport vehicle (AUTV) to provide mobility through urban neighborhoods, comprising a passenger detection system. In embodiments, passengers are detected by inward or outward-facing cameras. In embodiments, passengers are detected by weight or position sensors.

An aspect provided herein includes an autonomous urban transport vehicle (AUTV) to provide mobility through urban neighborhoods, comprising an emergency management system for managing emergencies. In embodiments, the AUTV has a system for automatically detecting and reporting emergency events to an emergency services system.

An aspect provided herein includes an autonomous urban transport vehicle to provide mobility through urban neighborhoods, comprising a playback system for enabling a presentation of audio content, video content, or other information related to a ride or route segment.

An aspect provided herein includes an autonomous urban transport vehicle (AUTV) to provide mobility through urban neighborhoods, comprising a system for detecting an underperforming vehicle driver/operator or other unwanted behavior and shutting down vehicle operation.

An aspect provided herein includes an autonomous urban transport vehicle (AUTV) platform to provide mobility through urban neighborhoods, comprising a fare calculation system for calculating an amount to charge for a passage of transporting a user to a destination.

An aspect provided herein includes an autonomous urban transport vehicle (AUTV) platform to provide mobility through urban neighborhoods, comprising a payment system for enabling payments related to vehicle rides.

An aspect provided herein includes an autonomous urban transport vehicle (AUTV) platform to provide mobility through urban neighborhoods, comprising a matching system for matching users and vehicles.

An aspect provided herein includes an autonomous urban transport vehicle (AUTV) platform to provide mobility through urban neighborhoods, comprising a system for generating a vehicle performance measure.

An aspect provided herein includes an autonomous urban transport vehicle (AUTV) platform to provide mobility through urban neighborhoods, comprising a system for enabling users to rate or review vehicles.

An aspect provided herein includes an autonomous urban transport vehicle (AUTV) platform to provide mobility through urban neighborhoods, comprising a system for detecting performance of a platform vehicle.

An aspect provided herein includes an autonomous urban transport vehicle (AUTV) platform to provide mobility through urban neighborhoods, comprising a system for dispatching a new vehicle to a user upon detection or reporting of a malfunctioning vehicle.

It is to be understood that any combination of features from the methods disclosed herein and/or from the systems, platforms, and/or architectures disclosed herein may be used together, and/or that any features from any or all of these aspects may be combined with any of the features of the embodiments and/or examples disclosed herein to achieve the benefits as described in this disclosure.

BRIEF DESCRIPTION OF THE FIGURES

In the accompanying figures, like reference numerals refer to identical or functionally similar elements throughout the separate views and together with the detailed description below are incorporated in and form part of the specification, serve to further illustrate various embodiments and to explain various principles and advantages all in accordance with the systems and methods disclosed herein. For example, reference numeral 161 and reference numeral 361 each refer to a similar steering control module housing.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the many embodiments of the systems and methods disclosed herein.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the many embodiments and associated examples are provided so that this disclosure will be thorough and will fully convey the concept of the disclosure to those skilled in the art; the claims, however, define the true scope of the disclosure.

Figure 1:
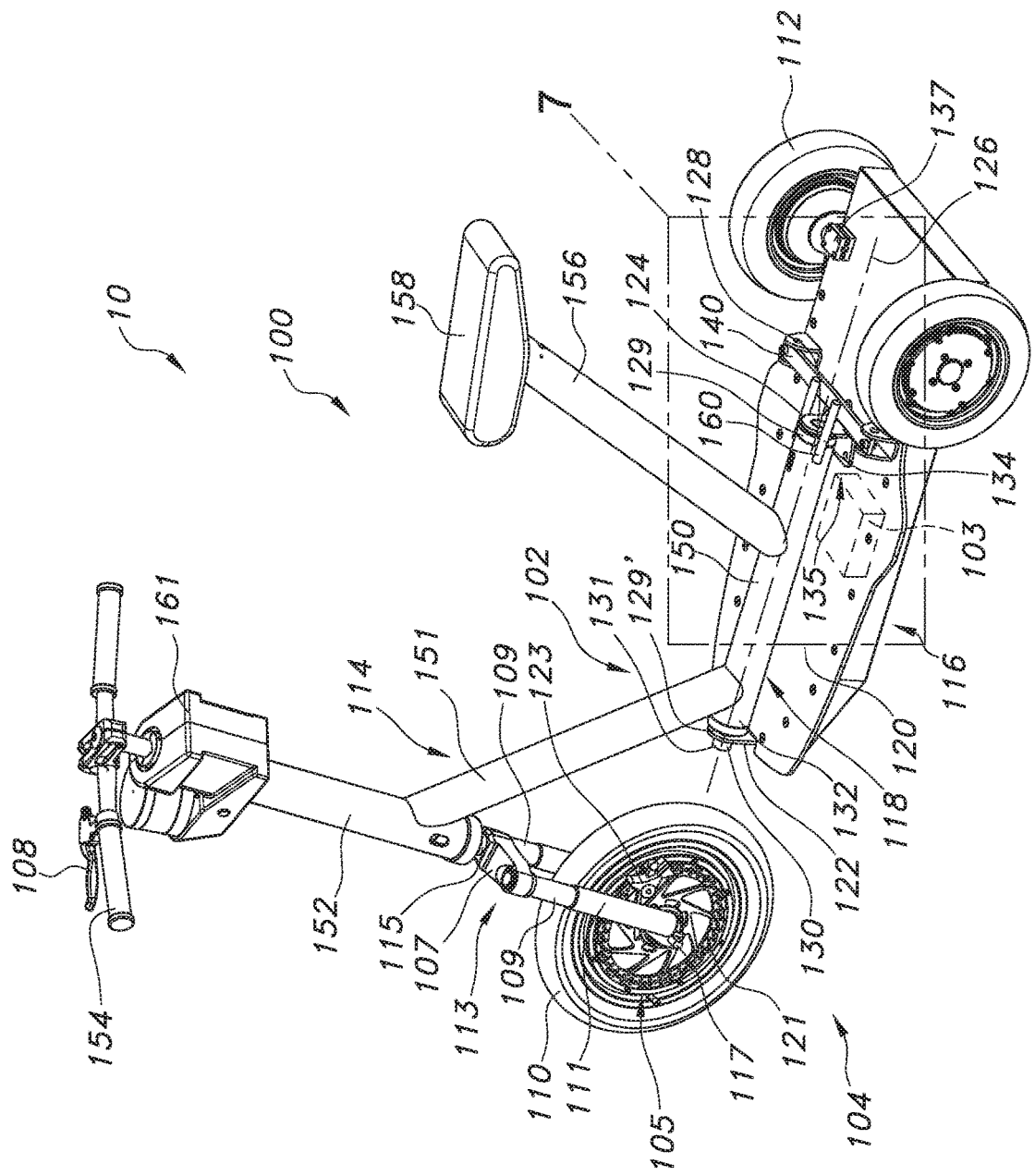
FIG. 1 is a low rear perspective view of an example of an autonomous urban transport vehicle (AUTV) according to the present disclosure.
Figure 2:
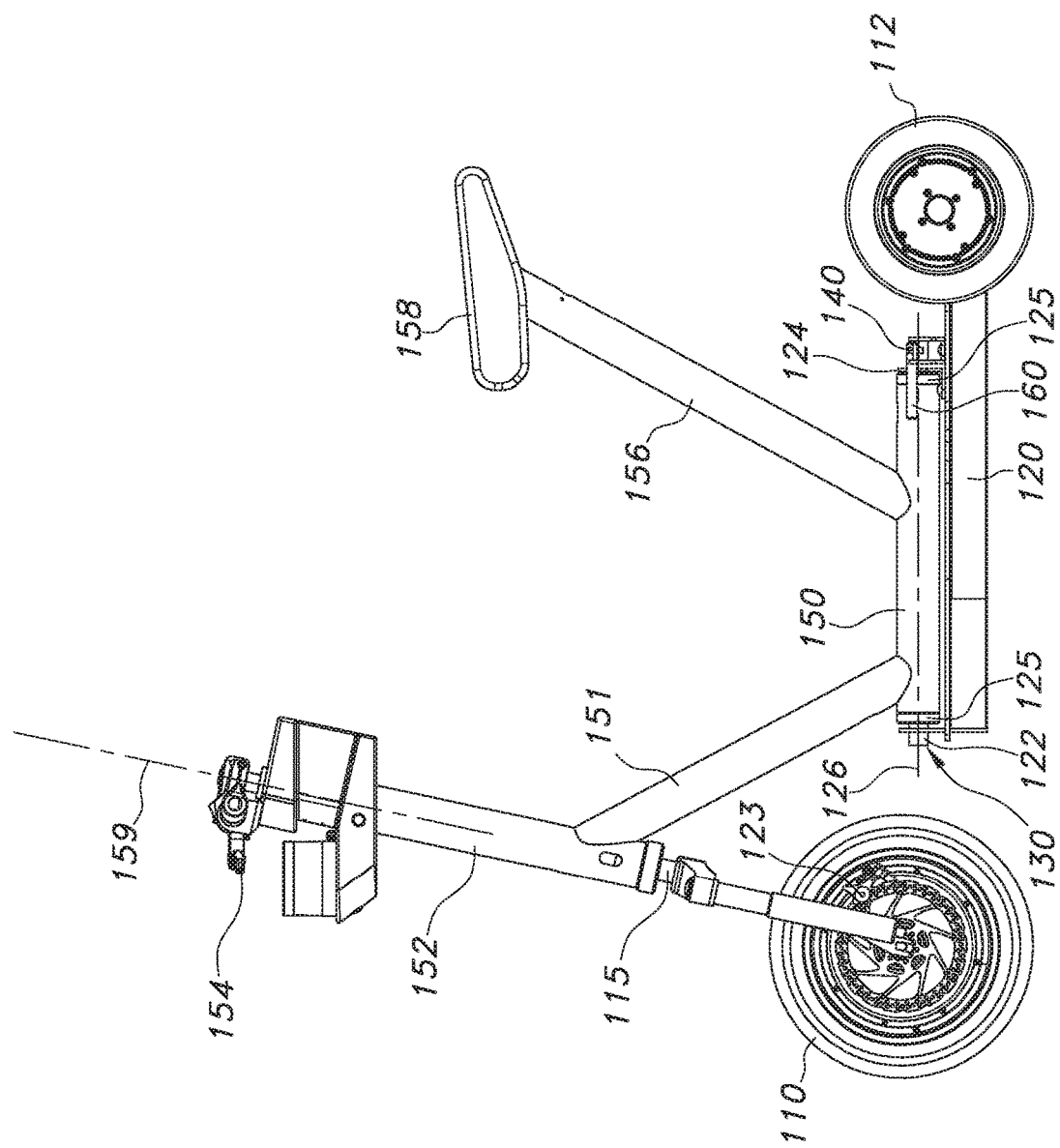
FIG. 2 is a left side view of the example of the AUTV depicted in FIG. 1 according to the present disclosure.
Figure 3:
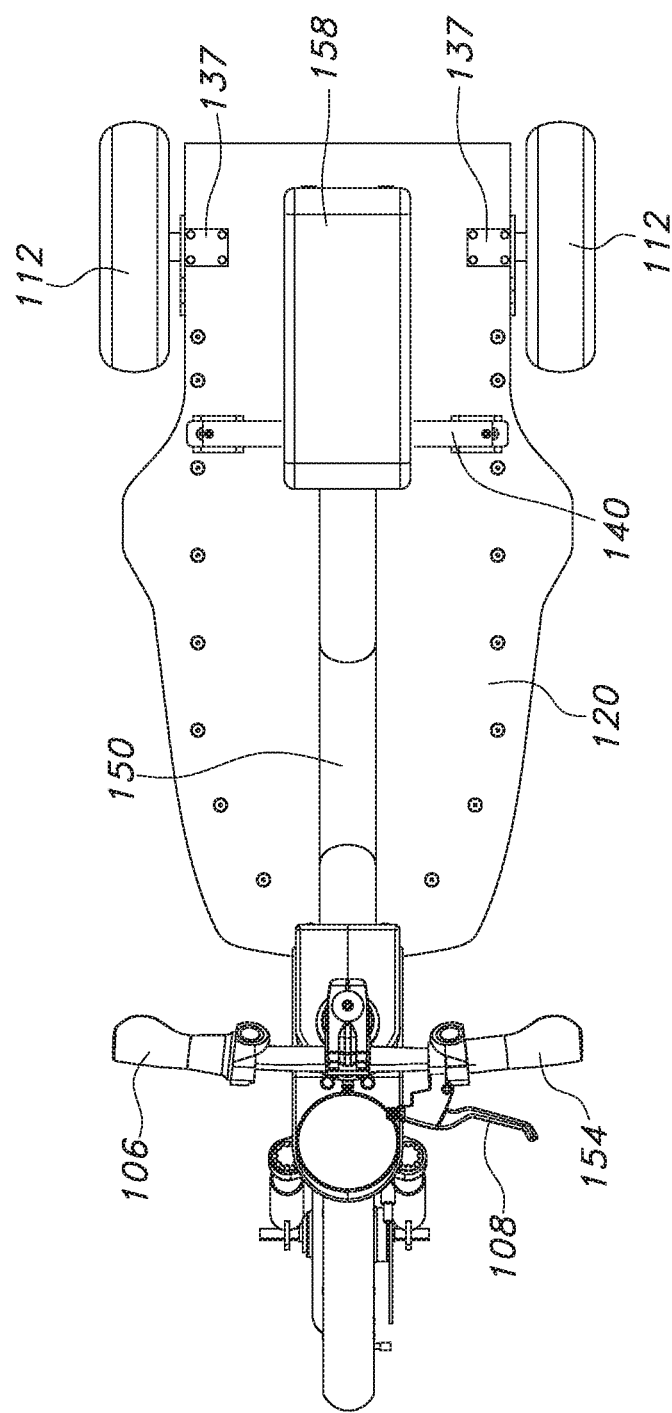
FIG. 3 is a top view of the example of the AUTV depicted in FIG. 1 according to the present disclosure.
Figure 5:
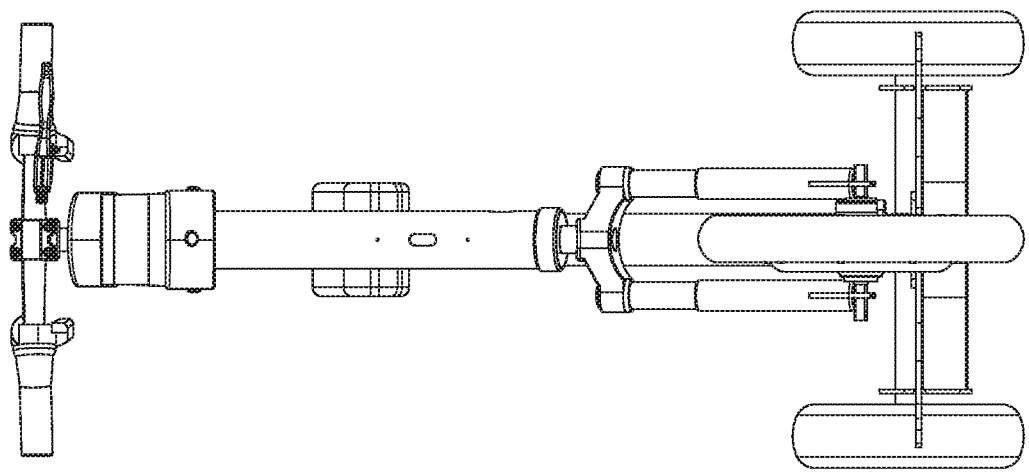
FIG. 5 is a front view of the example of the AUTV depicted in FIG. 1 according to the present disclosure.
Figure 4:
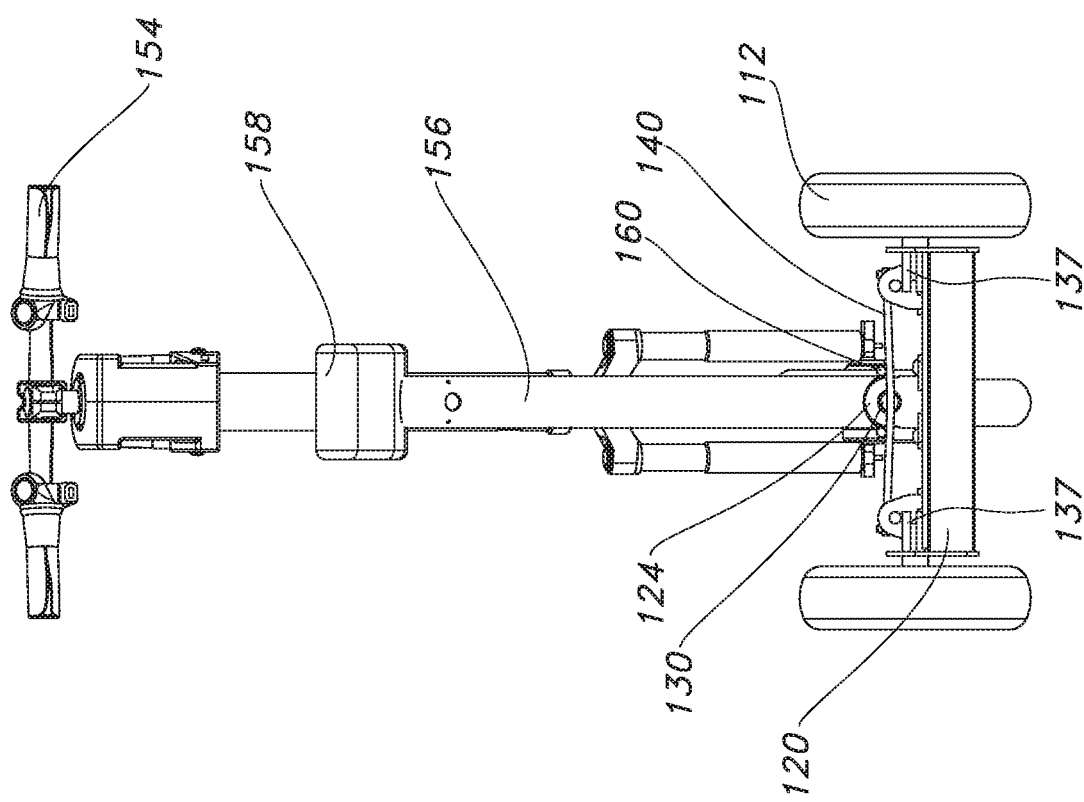
FIG. 4 is a rear view of the example of the AUTV depicted in FIG. 1 according to the present disclosure.
Figure 6:
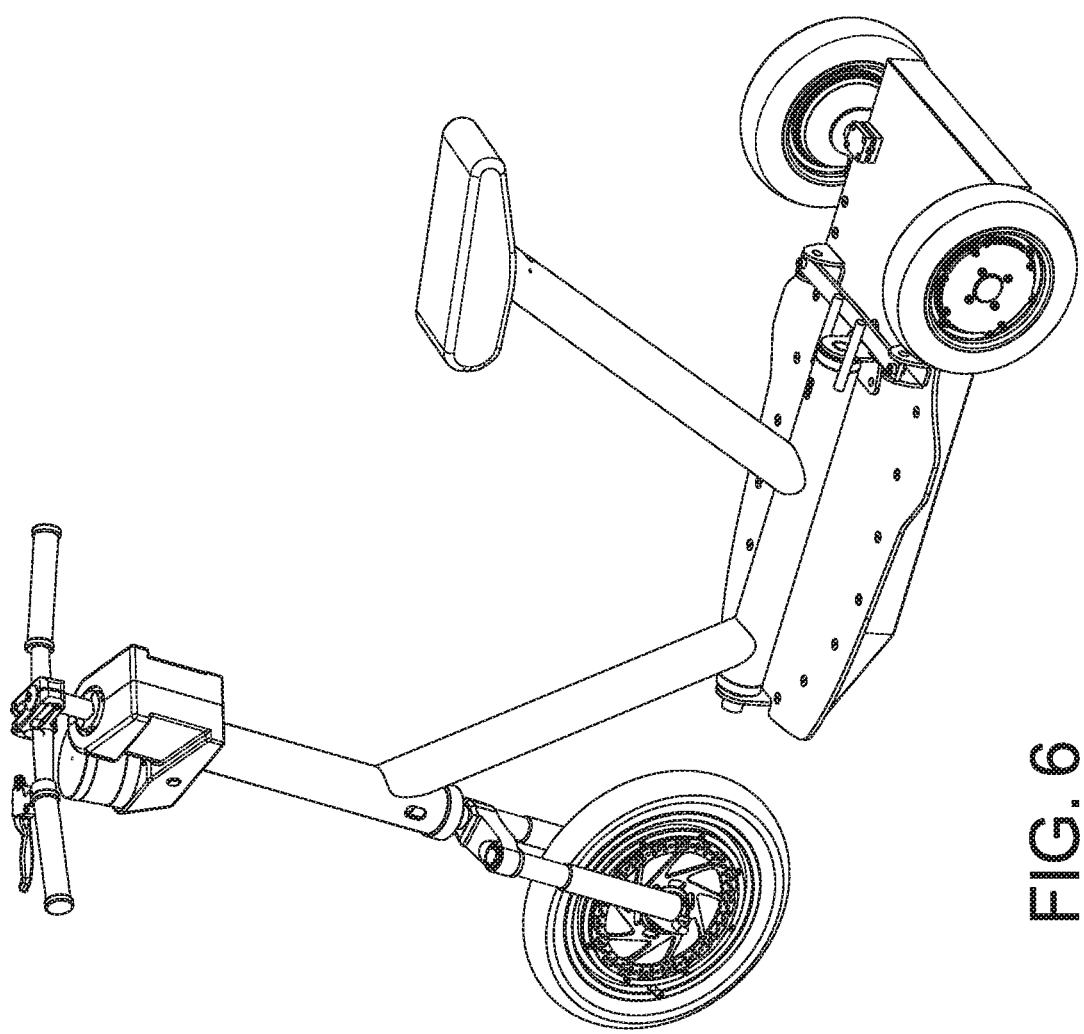
FIG. 6 is high rear perspective view of the example of the AUTV depicted in FIG. 1 according to the present disclosure.

In some embodiments, as depicted in FIGS. 1-17 and 24-31, the AUTV 10 of the present disclosure is a scooter 100 with an articulated frame 102. The example of the scooter 100 depicted in FIGS. 1-17 and 24-31 is a tricycle 104 which includes a front wheel 110, rear wheels 112, a handlebar 154, and a seat 158. The handlebar 154 includes user controls including a throttle control 106, a front brake lever 108 (not shown in FIGS. 24-31). In some examples, the throttle control 106 may be a twist throttle control as shown in FIG. 3, however, any suitable throttle control may be used. For example, a thumb lever (not shown) mounted on the handlebar 154 may be used. The drive motor(s) may be mounted in or near the front wheel 110 and/or the rear wheels 112.

It is to be understood that the term "throttle" does not imply that the AUTV of the present disclosure necessarily has an internal combustion engine. In vehicles with internal combustion engines, the driver manipulates a throttle (directly or by remote control) to regulate air flow in order to achieve a desired air-fuel ratio in the engine, thereby developing a desired level of power for rotating the drive wheels. In an electric vehicle, there is no internal combustion engine, therefore, there is no requirement to regulate or throttle combustion air flow. In an electric vehicle, the driver manipulation of the "throttle" control is converted to an electrical signal that is converted to an electric motor power demand and sent to the motor controller. The motor controller then commands the motor to draw the requested amount of power from a battery.

In embodiments as depicted in FIGS. 1-17 and 32A-39, a steering control module housing 161 is located near the top of the head tube 152 on the rearward side facing the seat 158. The steering control module housing 161 may contain a steering control motor that is connected to the steerer tube 115 by a drive belt. In an example, the drive belt may have cogs defined thereon for engaging complementary structures, for example splines, on the steerer tube 115. A Light Detection and Ranging (LIDAR) unit 145 is mounted on the head tube 152 on the forward side opposite the steering control module housing 161.

In embodiments of the present disclosure, the articulated frame 102 includes an upper portion 114 and lower portion 116 that are connected via a hinge 118. The upper portion 114 includes various structural members such as a main beam 150, a down tube 151, a head tube 152, and a seat tube 156. The main beam 150, down tube 151, seat tube 156, and head tube 152 are rigidly affixed to one another. The main beam 150 is connected to the lower portion 116 at hinged joints. The main beam 150 is rotatable about a tilt axis 126. The rotation of the main beam 150 about the tilt axis 126 is independent of a camber of the rear wheels 112. The tilt axis 126 can be longitudinal with respect to the AUTV 10.

In the example depicted in FIGS. 1-17 and FIGS. 24-31, a suspension fork 113 includes an arch 107 connecting two lowers 109. The two lowers 109 slide in/on stanchion tubes 111, which are connected to the front axle 117. The lowers 109 and the stanchion tubes 111 may be part of shock absorber assemblies. In the example depicted in FIGS. 32A-39, the arch 307 is rigidly attached to the stanchion tubes 311. In the example depicted in FIGS. 1-17, and FIGS. 32A-39 a disc brake 105, 305 is connected to the front wheel 110, 310. The disc brake 105, 305 has a cross-drilled rotor 121, 321 attached to the front wheel 110, 310 to rotate with the front wheel 110, 310. The disc brake 105 also includes a brake caliper 123 attached to the suspension fork 113 to selectably squeeze the cross-drilled rotor 121 when the front brake lever 108 is actuated, thereby producing a friction braking force to retard rotation of the front wheel 110. It is to be understood that any suitable brake may be used in place of or together with the disc brake 105.

In embodiments, as depicted in FIGS. 1-17 and FIGS. 24-31, the head tube 152 is rigidly connected to the down tube 151. The head tube 152 defines a steering axis 159. A steerer tube 115 is rotatably disposed in the head tube 152 to rotate about the steering axis 159. The steerer tube 115 is connected to the arch 107 of the suspension fork 113 for rotation therewith. The handlebar 154 is connected to the steerer tube 115 for rotation therewith. The down tube 151 is rigidly affixed to the main beam 150. The seat tube 156 is rigidly affixed to the main beam 150. A seat 158 is attached to the seat tube 156.

Figure 25:
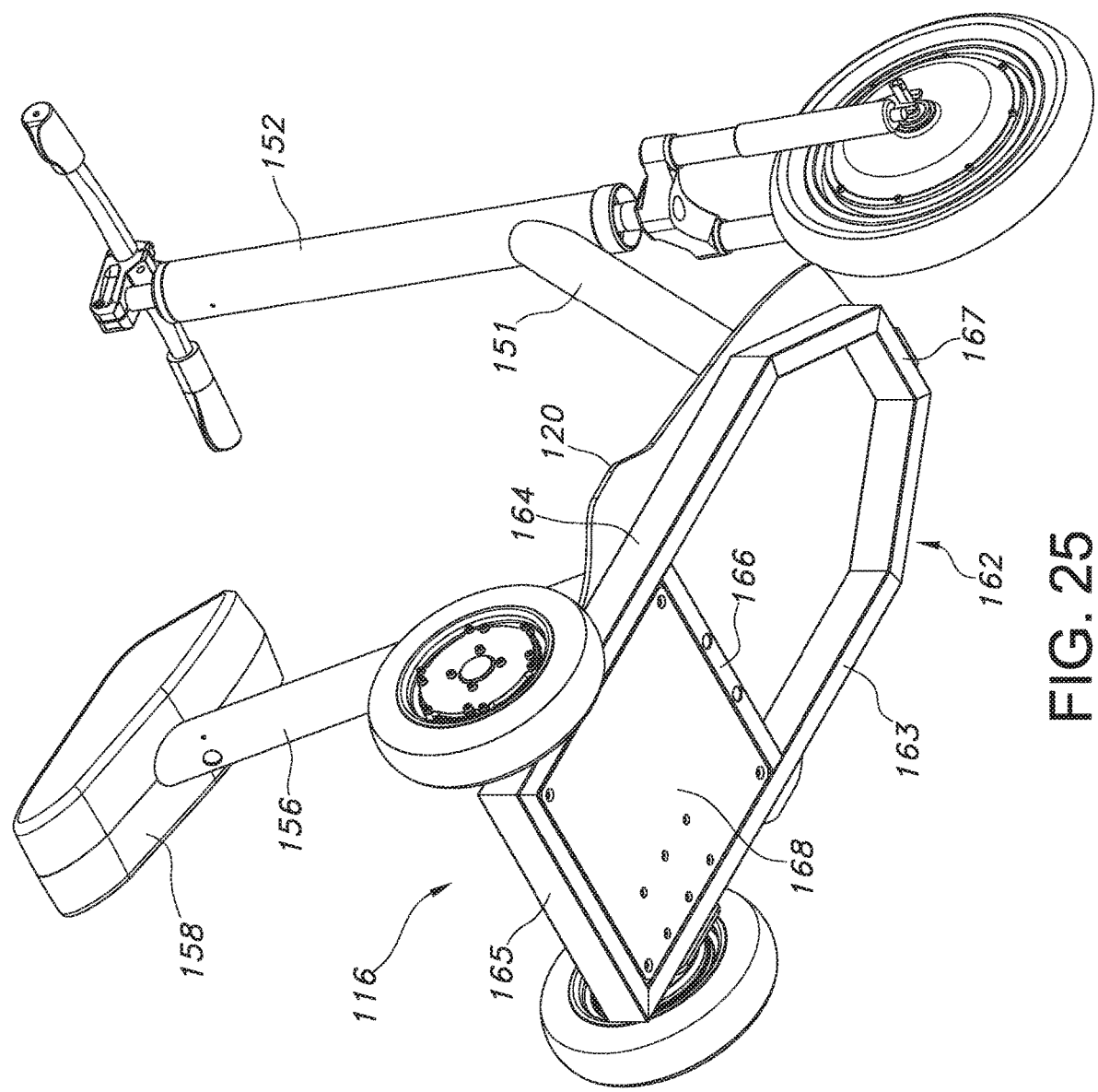
FIG. 25 is a right lower rear perspective view of the example of the AUTV depicted in FIG. 24 according to the present disclosure.
Figure 27:
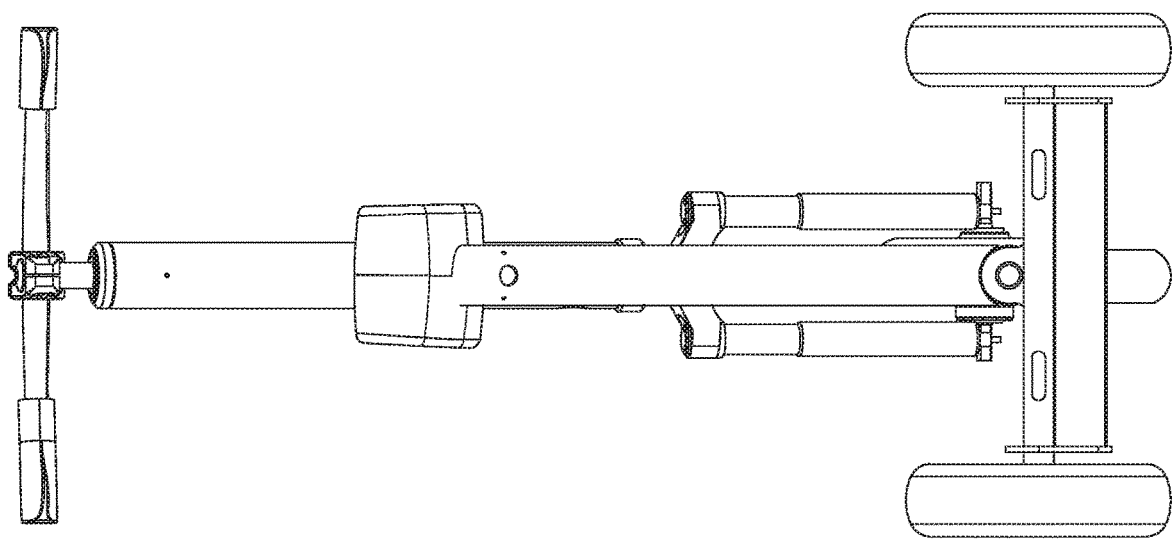
FIG. 27 is a rear view of the example of the AUTV depicted in FIG. 24 according to the present disclosure.
Figure 26:
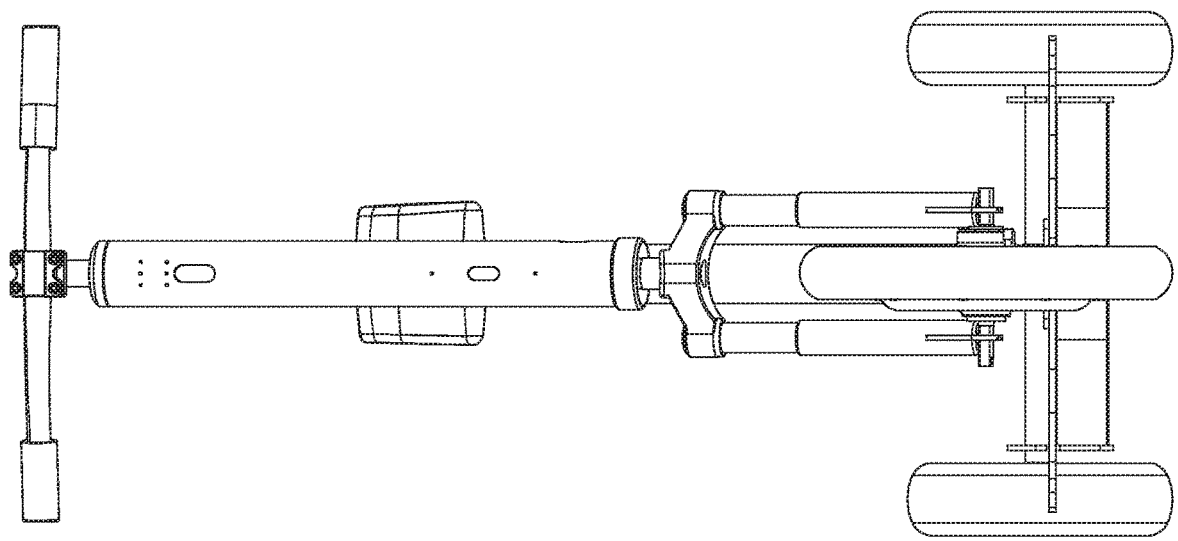
FIG. 26 is a front view of the example of the AUTV depicted in FIG. 24 according to the present disclosure.
Figure 28:
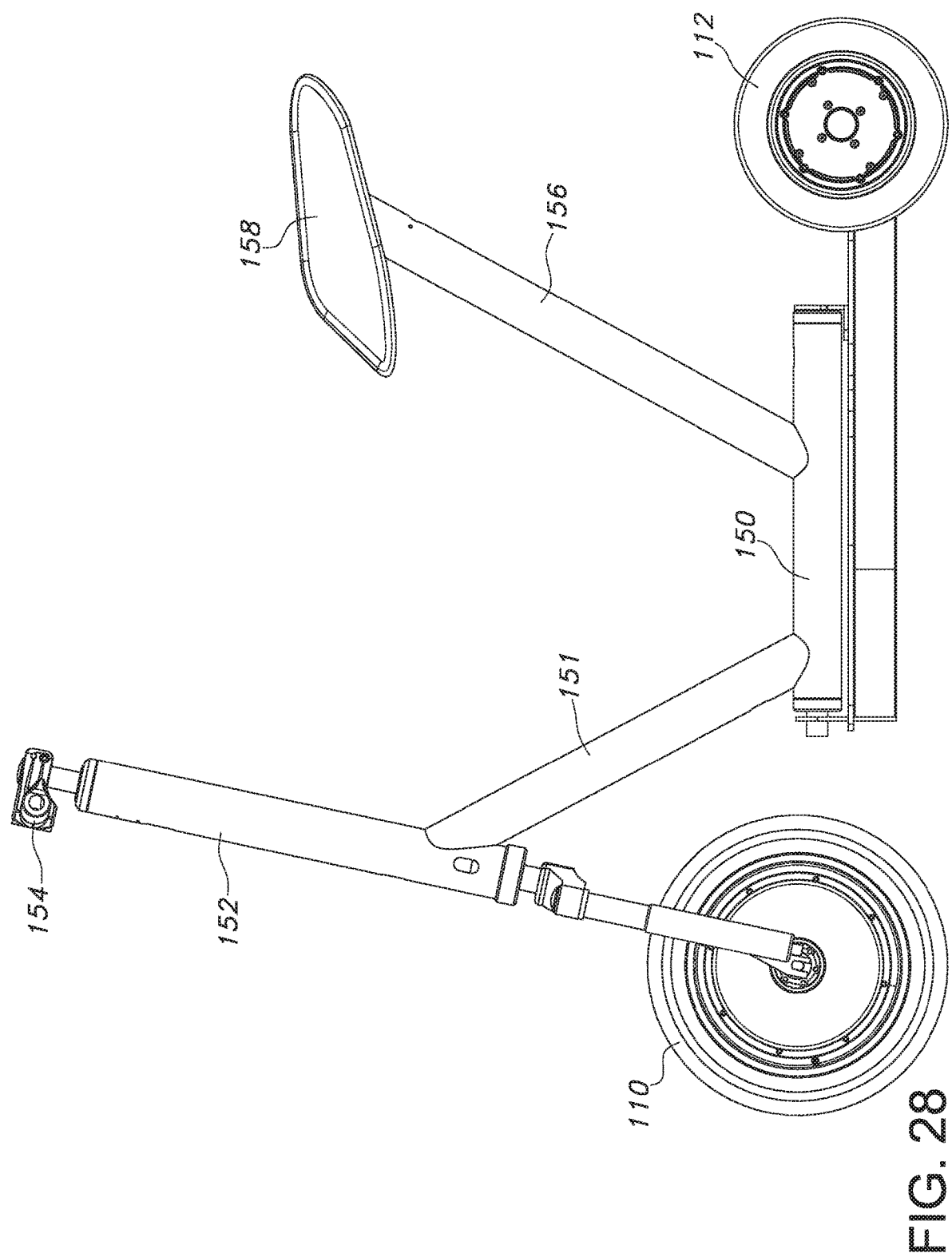
FIG. 28 is a left side view of the example of the AUTV depicted in FIG. 24 according to the present disclosure.
Figure 29:
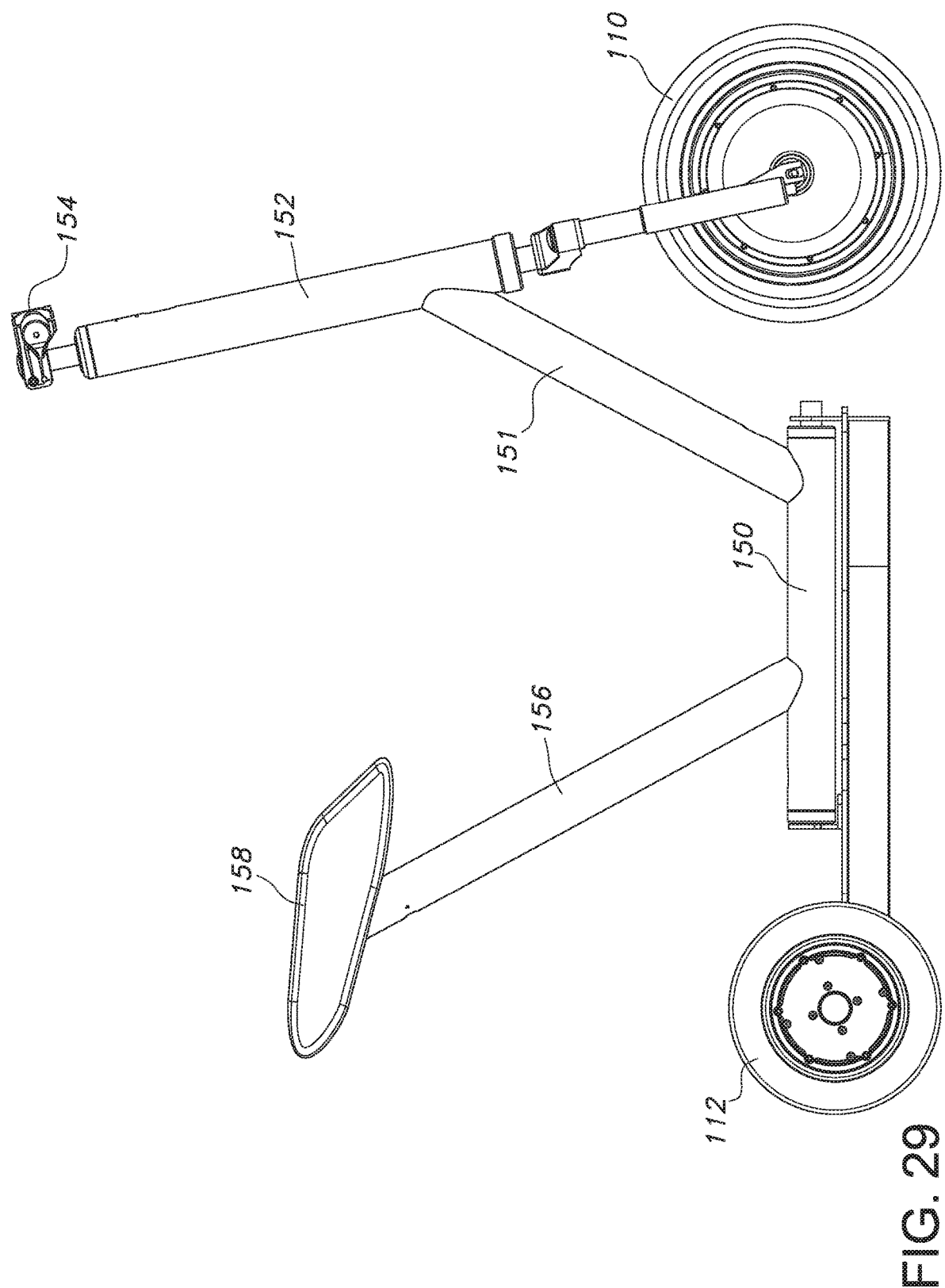
FIG. 29 is a right side view of the example of the AUTV depicted in FIG. 24 according to the present disclosure.

In embodiments, the lower portion 116 may include a lower subframe 162 having ladder frame construction. (See, e.g., FIG. 25.) A left frame rail 163 and a right frame rail 164 are located on opposite sides of the lower subframe 162. A rear transverse cross-member 165 connects the left frame rail 163 and the right frame rail 164 at the rear ends of the frame rails 163, 164. A front transverse cross-member 167 connects the left frame rail 163 and the right frame rail 164 at the front ends of the frame rails 163, 164. A middle transverse cross-member 166 connects the left frame rail 163 and the right frame rail 164 between the front transverse cross-member 167 and the rear transverse cross-member 165. The left frame rail 163 and a right frame rail 164 may be parallel to each other, however, a portion of the lower subframe 162 may be narrower at the front end as depicted in FIG. 25. The left frame rail 163 and the right frame rail 164 may have any suitable cross-section, for example the left frame rail 163 and the right frame rail 164 may be boxed frame members, c-shaped frame members, hat frame members or combinations thereof. Members of the lower subframe 162, e.g., the left frame rail 163, the right frame rail 164, front transverse cross-member 167, middle transverse cross-member 166, and rear transverse cross-member 165 may be rigidly joined, for example by welding or by brackets and fasteners, or by combinations of welding, brackets, and fasteners. A rear belly pan 168 is depicted in FIG. 25, mounted between the middle transverse cross-member 166, and rear transverse cross-member 165.

Figure 31:
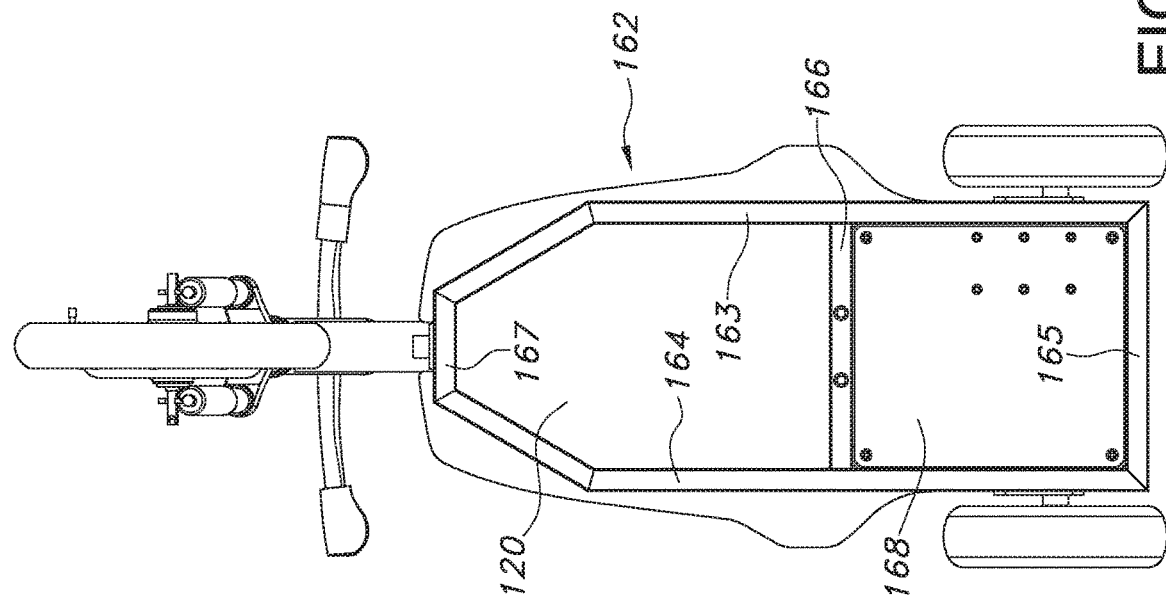
FIG. 31 is a bottom view of the example of the AUTV depicted in FIG. 24 according to the present disclosure.
Figure 30:
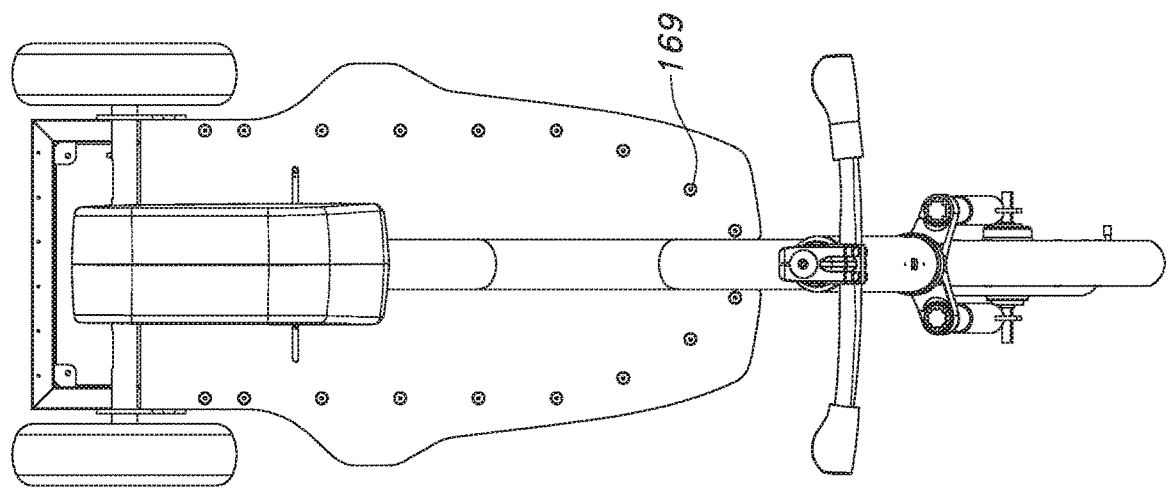
FIG. 30 is a top view of the example of the AUTV depicted in FIG. 24 according to the present disclosure.

In embodiments, the lower portion 116 of the articulated frame 102 can have a deck 120 and rear wheels 112 attached thereto. As shown in FIG. 30 and FIG. 31, tamper resistant fasteners 169 can affix the deck 120 to the lower subframe 162, thereby forming a stiff and mechanically stable base for the AUTV. In the embodiment depicted in FIGS. 1-17, the rear wheels 112 are attached to the deck 120 with axle clamp brackets 137. A computing device 103 for implementing guidance and navigation functionality for the user and scooter 100 may be located below deck 120. In the embodiment depicted in FIGS. 24-31, an axle tube 138 connects the rear wheels 112 to each other and supports the rear wheels without spring suspension. In the embodiment depicted in FIGS. 1-17 and FIGS. 24-31, a forward hinge knuckle 122 and a rear hinge knuckle 124 are rigidly attached to the lower portion 116. A forward hinge aperture is defined by the forward hinge knuckle 122. A rear hinge aperture 128 is defined by the rear hinge knuckle 124. The forward hinge aperture and the rear hinge aperture 128 define the tilt axis 126. In some embodiments, the hinge knuckles 122, 124 are rigidly affixed to the deck 120. In some embodiments, the hinge knuckles 122, 124 are rigidly connected directly to the lower portion 116 of the articulated frame 102. In some examples, the forward hinge aperture and the rear hinge aperture 128 are each concentric with the main beam 150, specifically with respect to the longitudinal axis of the main beam 150 which is coaxial with the tilt axis 126. Together, the forward hinge knuckle 122, the rear hinge knuckle 124 and the main beam 150 form a hinge 118 that enables rotation of the upper portion 114 of the articulated frame 102 with respect to the lower portion 116 about the longitudinal axis of the main beam 150. In an embodiment, the hinge 118 further includes bearing assemblies 125 to reduce friction and end cap 130 to secure the bearing assemblies 125. In an embodiment, the bearing assemblies 125 include a forward pillow block bearing assembly 129' and a rear pillow block bearing assembly 129. The forward hinge knuckle 122 includes the forward pillow block bearing assembly 129' and the rear hinge knuckle 124 includes the rear pillow block bearing assembly 129.

In embodiments, a forward spindle 131 is attached to the main beam 150 at a forward end 132 of the main beam 150. The forward spindle 131 defines the tilt axis 126. A rear spindle 133 is attached at a rear end 134 of the main beam 150 distal to the forward end 132 of the main beam 150. The rear spindle 133 also defines the tilt axis 126 along with the forward spindle 131.

The hinge 118 can also include a biasing mechanism 135 to bias the upper portion 114 of the frame in a vertical orientation. In embodiments, as depicted in FIGS. 1-17, the biasing mechanism 135 includes a leaf spring 140 affixed to the deck 120 and rigid arms 160 affixed to the main beam 150. When the upper portion 114 of the articulated frame 102 of the scooter 100 is tilting for a turn, for example, the upper portion 114 of the articulated frame 102 is made to tilt to one side, thus causing an arm 160 to rotate down onto the spring 140. The more the upper portion 114 tilts, the more the arm 160 depresses the leaf spring 140. The spring 140, therefore, provides a corrective force to assist the user to restore the orientation of the scooter 100 to its upright position when transitioning from the turn back to straight motion.

Figure 7:
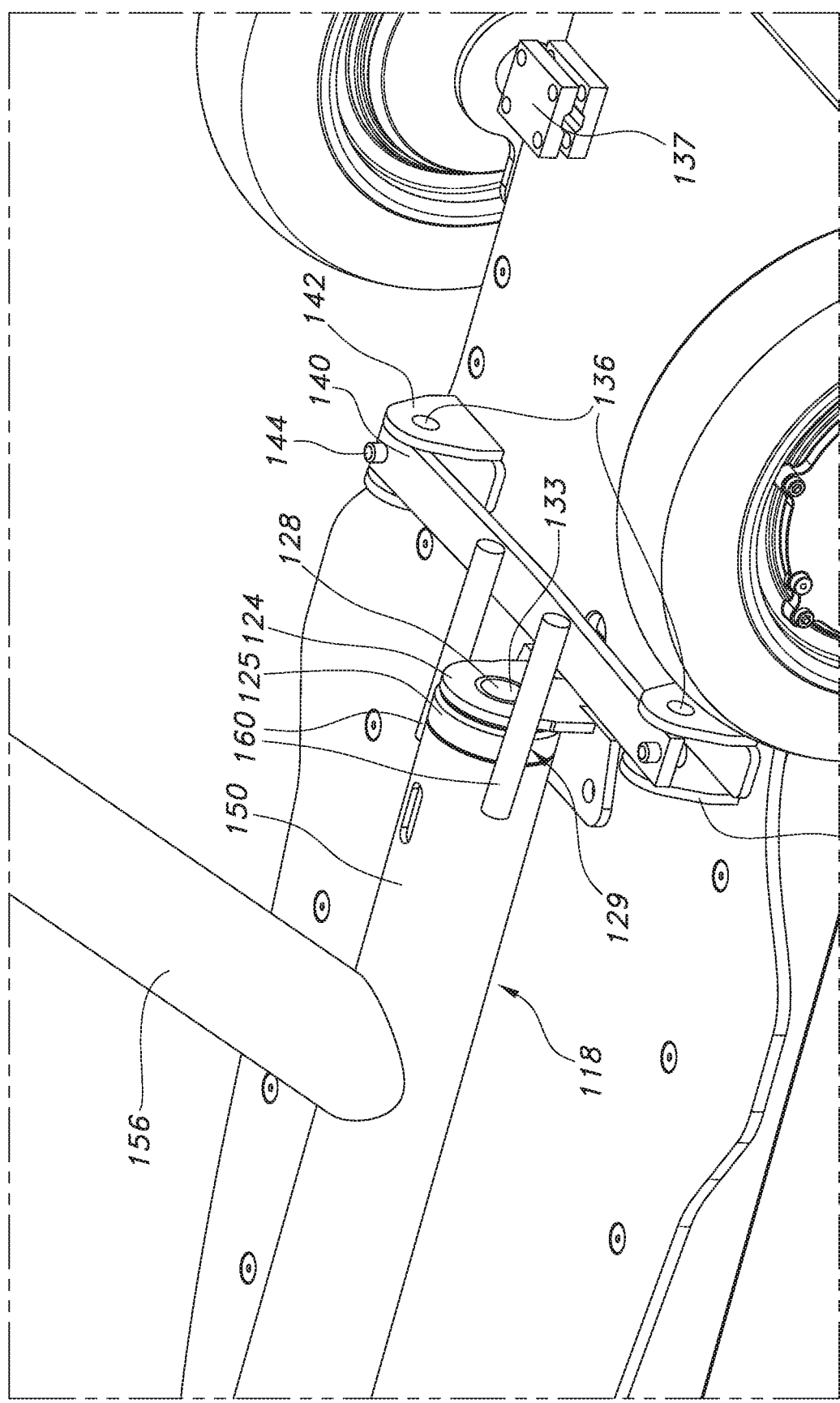
FIG. 7 is a detail perspective view of a portion of the AUTV as indicated in FIG. 1 according to the present disclosure.
Figure 8:
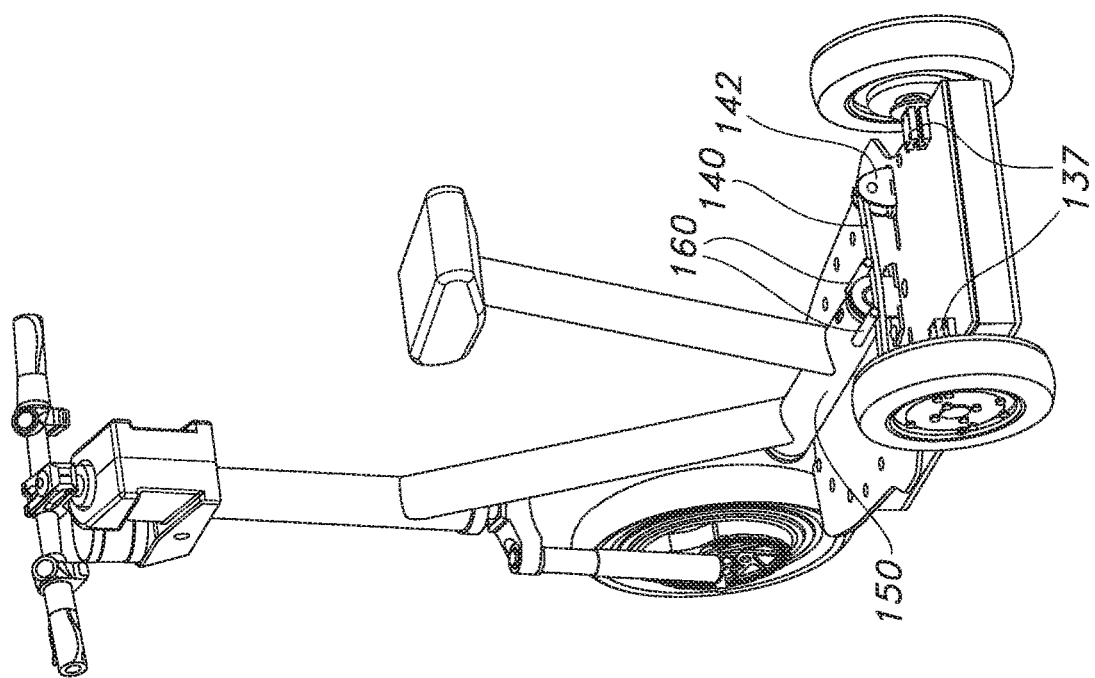
FIG. 8 is a left rear perspective view of the example of the AUTV depicted in FIG. 1 with the frame depicted in a vertical orientation according to the present disclosure.
Figure 9:
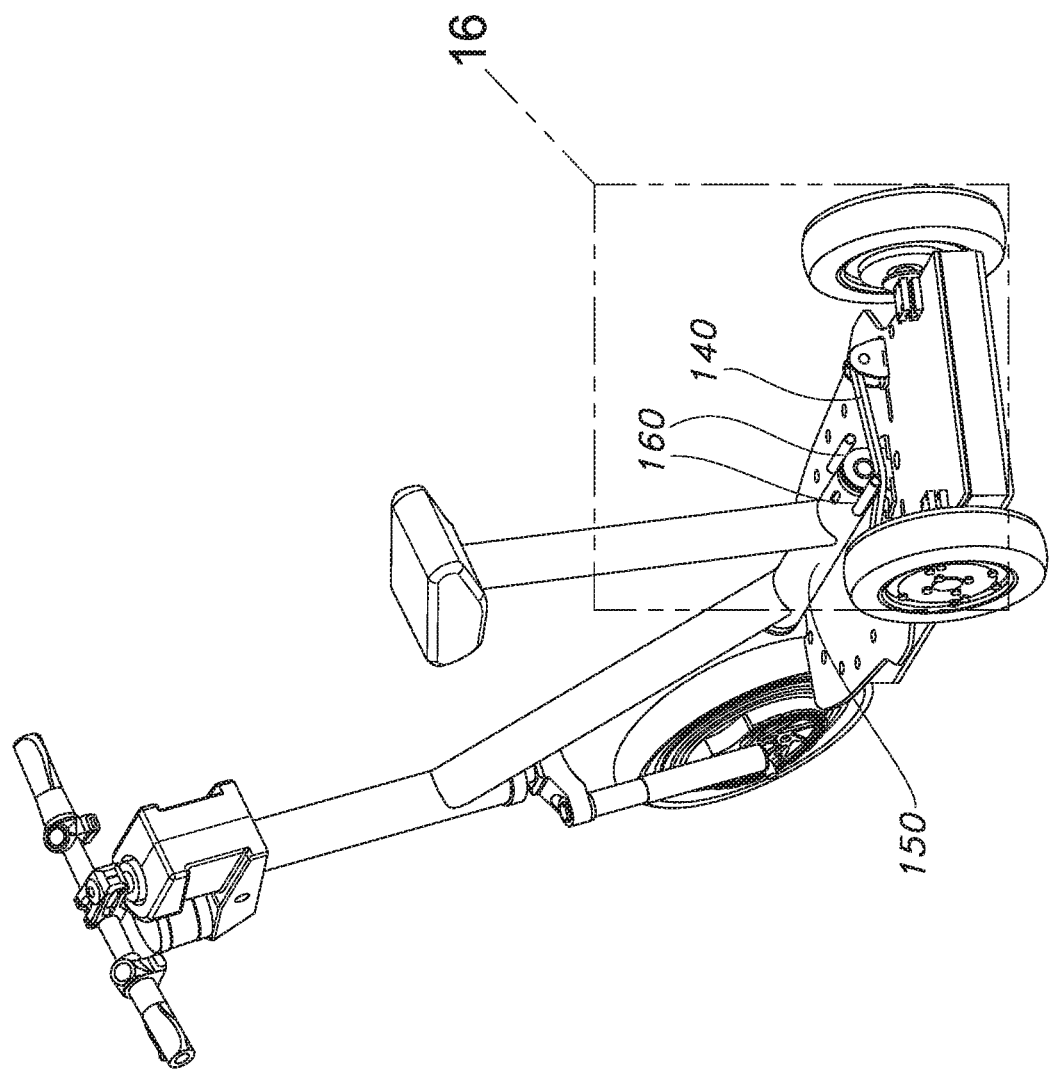
FIG. 9 is a left rear perspective view of the example of the AUTV depicted in FIG. 8 with the upper portion of the AUTV frame tilting to the left according to the present disclosure.
Figure 10:
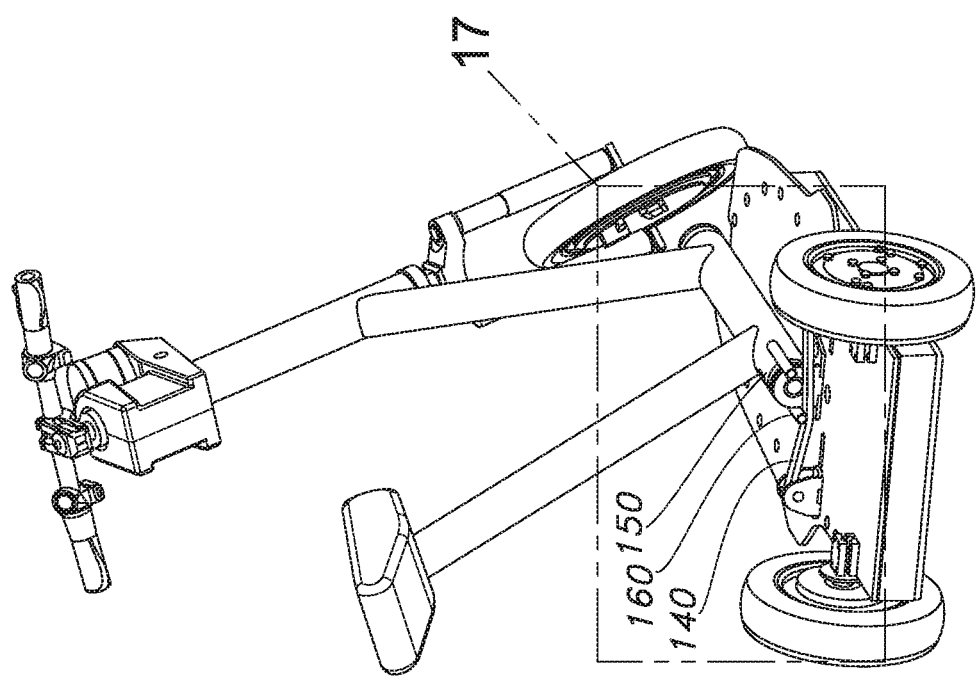
FIG. 10 is a right rear perspective view of the example of the AUTV depicted in FIG. 8 with the upper portion of the AUTV frame tilting to the left according to the present disclosure.
Figure 11:
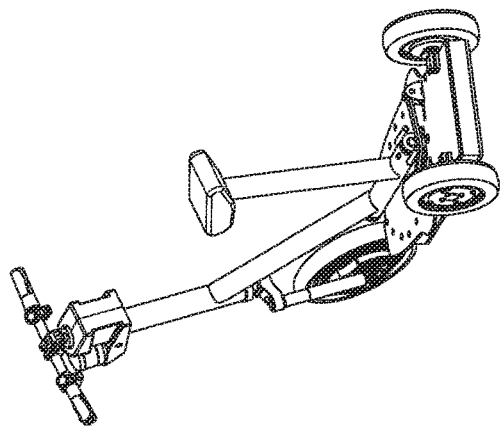
FIG. 11 is a high rear perspective view of the example of the AUTV depicted in FIG. 8 with the upper portion of the AUTV frame tilting to the left according to the present disclosure.
Figure 15:
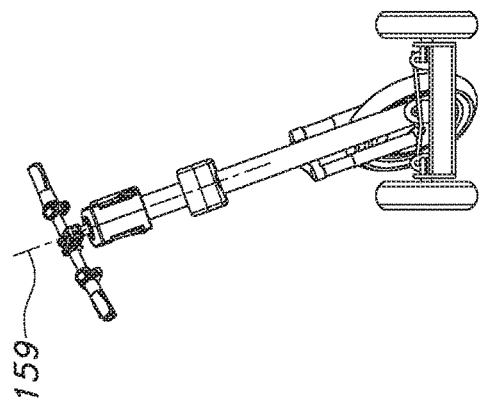
FIG. 15 is a rear view of the example of the AUTV depicted in FIG. 8 with the upper portion of the AUTV frame tilting to the left according to the present disclosure.
Figure 12:
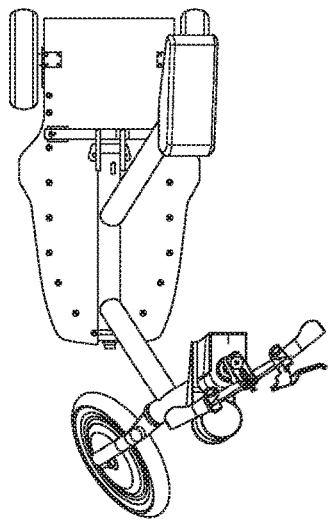
FIG. 12 is a top view of the example of the AUTV depicted in FIG. 8 with the upper portion of the AUTV frame tilting to the left according to the present disclosure.
Figure 14:
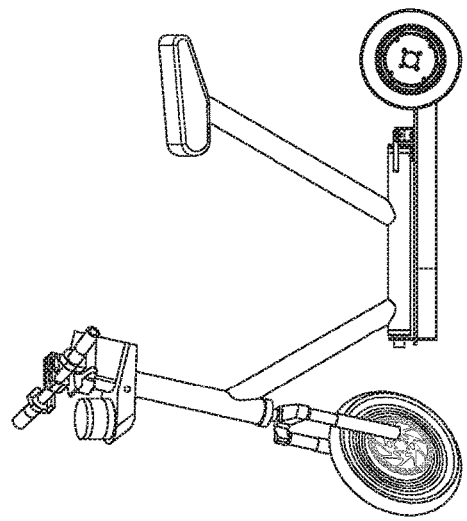
FIG. 14 is a left side view of the example of the AUTV depicted in FIG. 8 with the upper portion of the AUTV frame tilting to the left according to the present disclosure.
Figure 13:
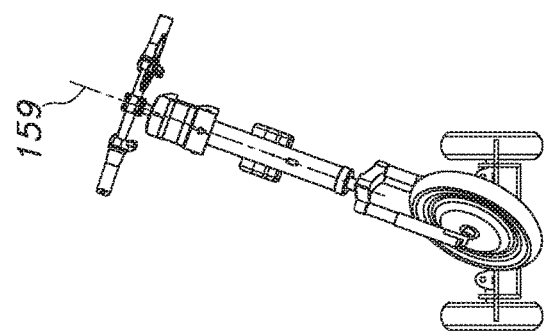
FIG. 13 is a front view of the example of the AUTV depicted in FIG. 8 with the upper portion of the AUTV frame tilting to the left according to the present disclosure.
Figure 16:
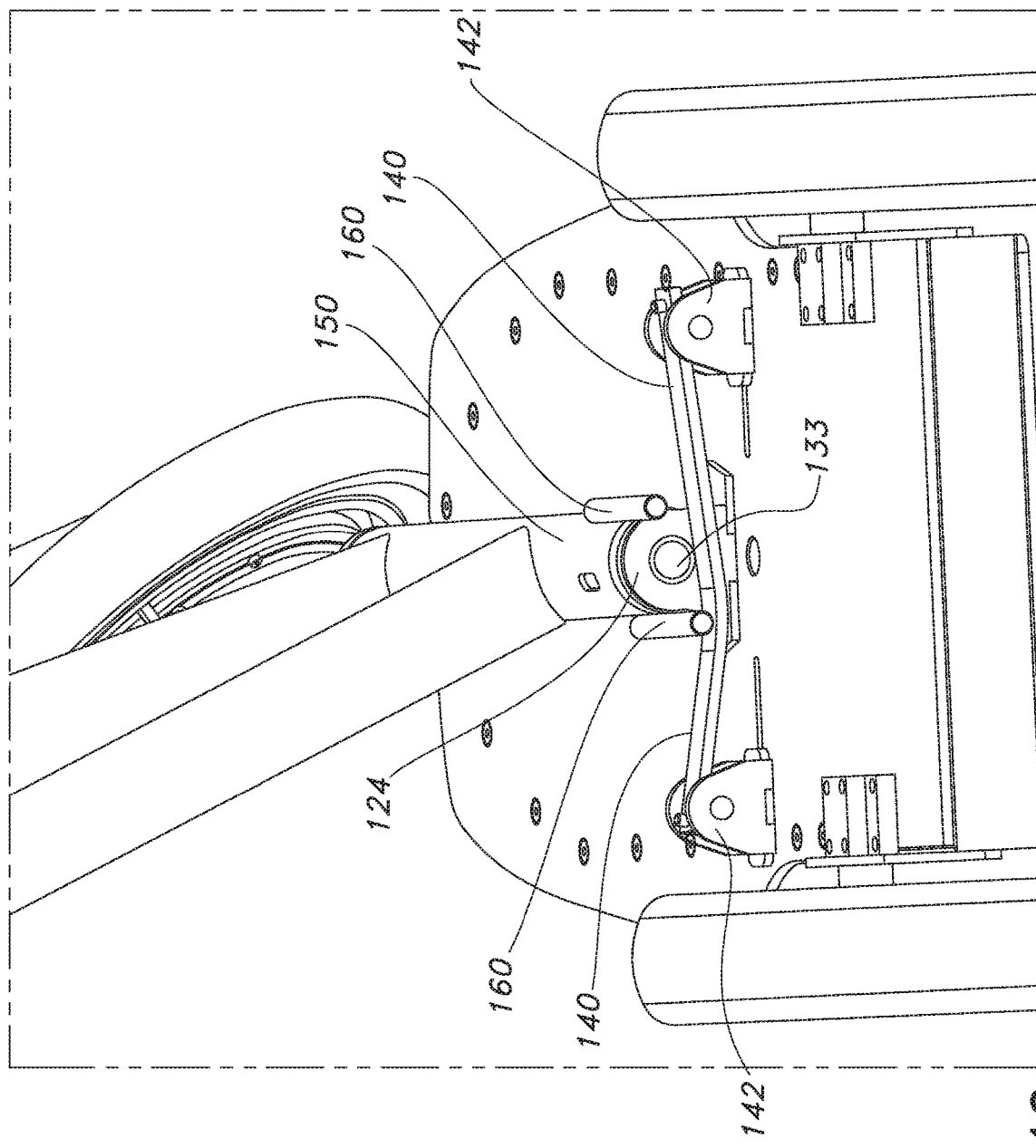
FIG. 16 is a detail perspective view of a portion of the AUTV as indicated in FIG. 9 according to the present disclosure.
Figure 17:
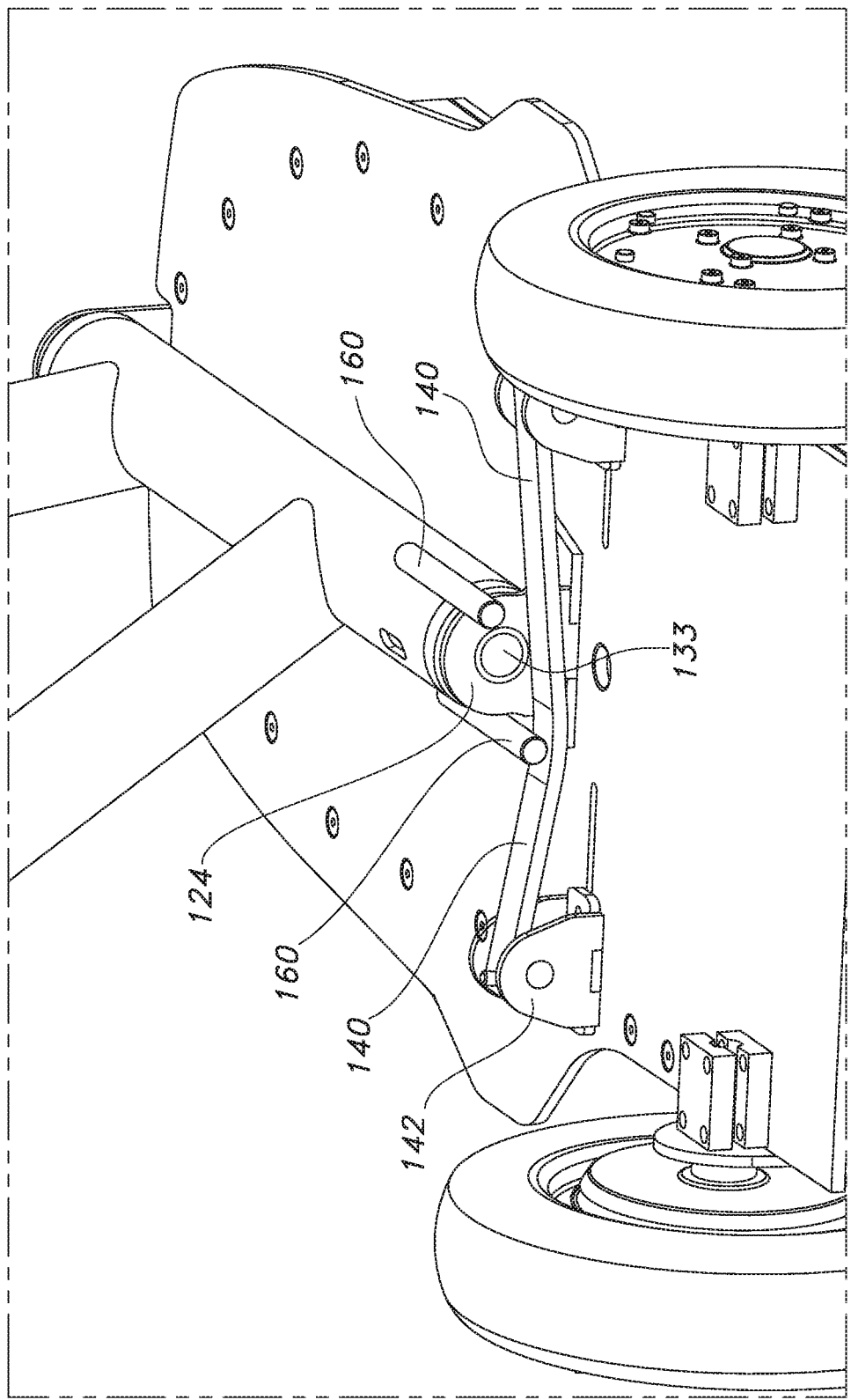
FIG. 17 is a detail perspective view of a portion of the AUTV as indicated in FIG. 10 according to the present disclosure.
Figure 18:
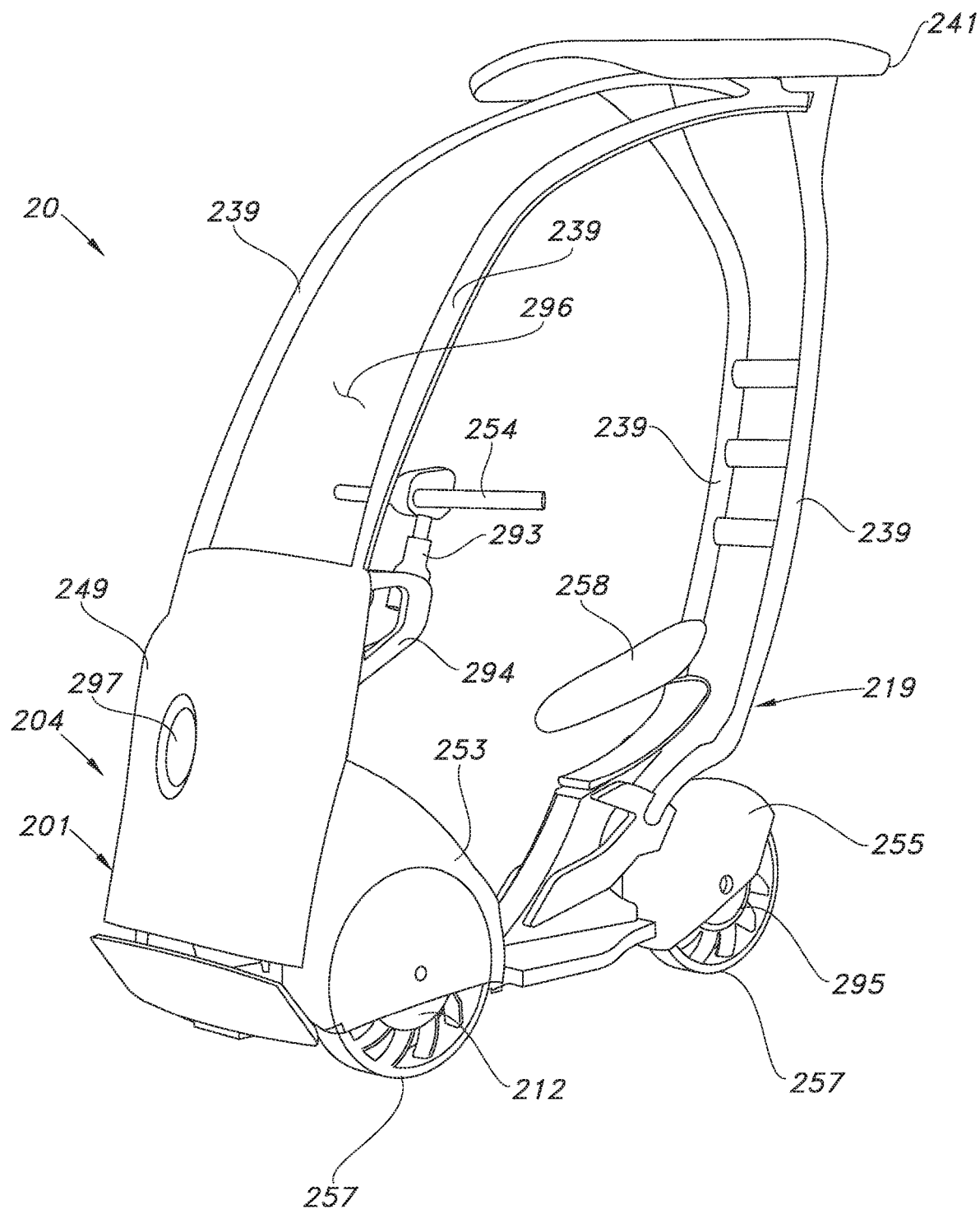
FIG. 18 is a front perspective view of an example of an autonomous urban transport vehicle (AUTV) according to the present disclosure.
Figure 19:
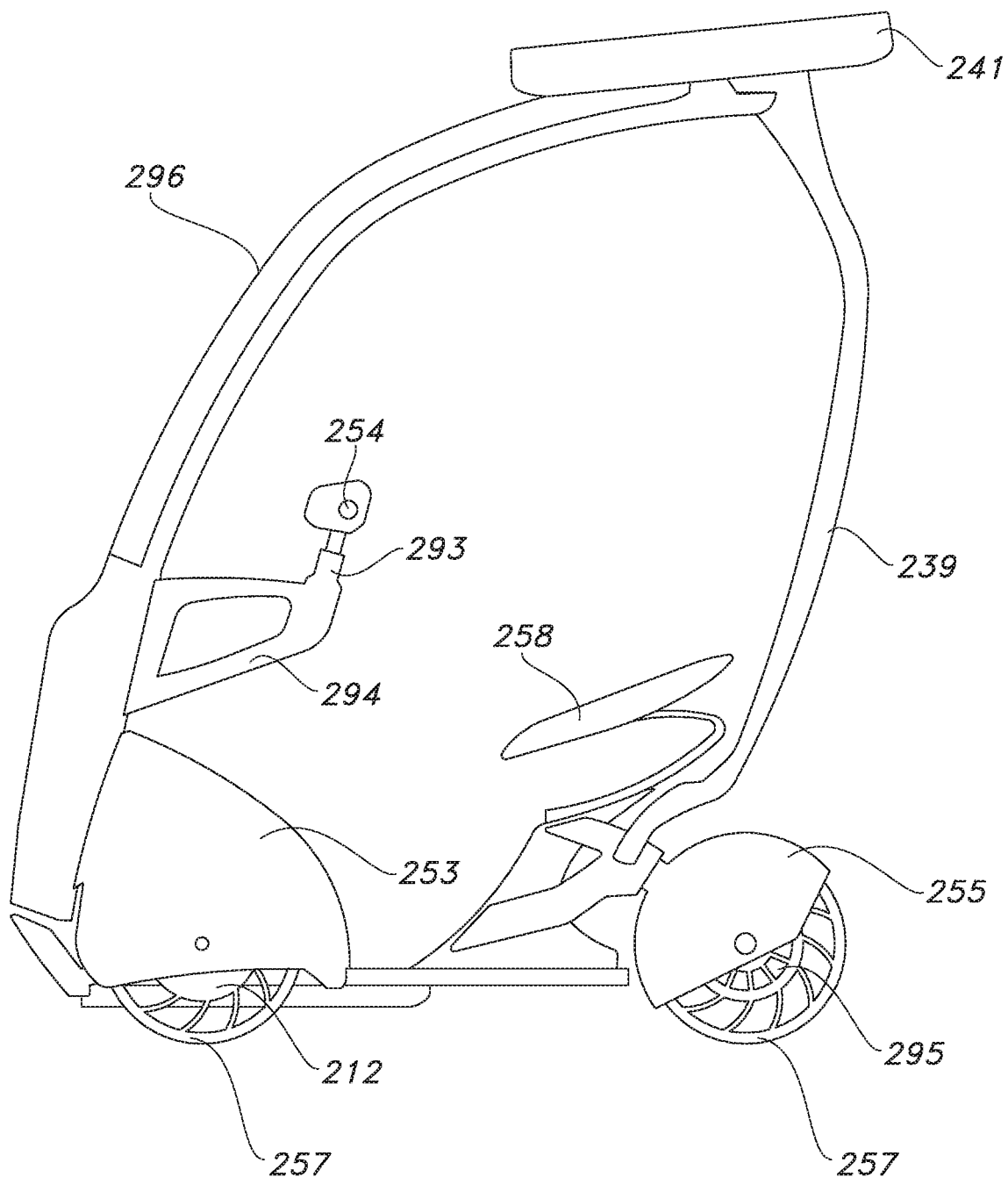
FIG. 19 is a side view of the example of the AUTV depicted in FIG. 18 according to the present disclosure.
Figure 20:
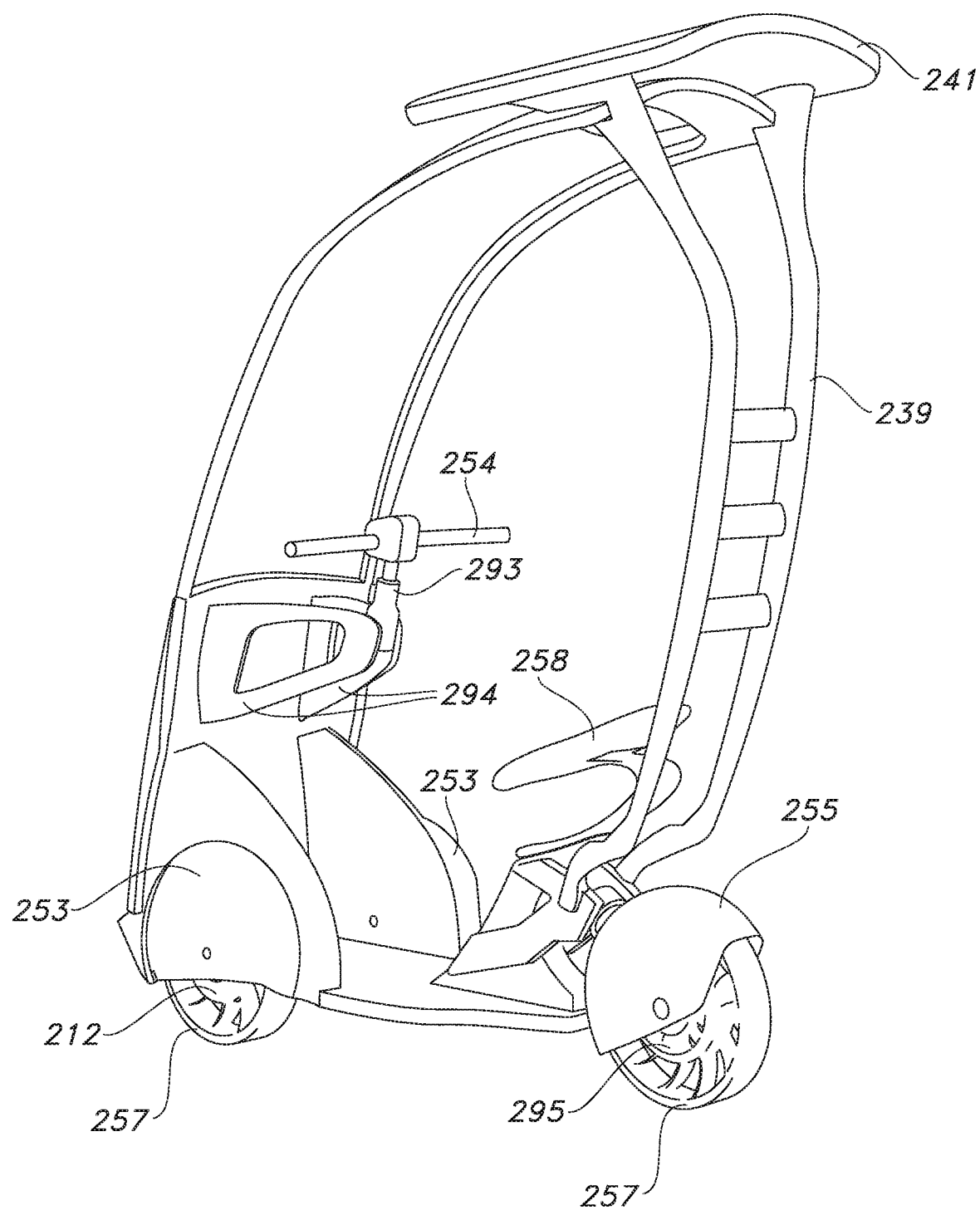
FIG. 20 is a rear perspective view of the example of the AUTV depicted in FIG. 18 according to the present disclosure.
Figure 21:
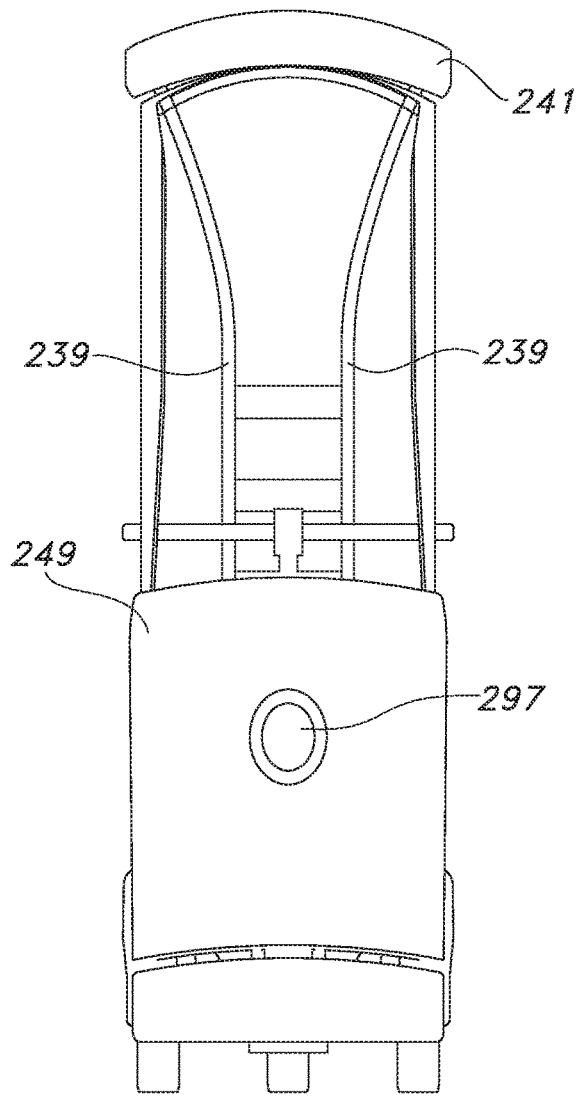
FIG. 21 is a front view of the example of the AUTV depicted in FIG. 18 according to the present disclosure.
Figure 22:
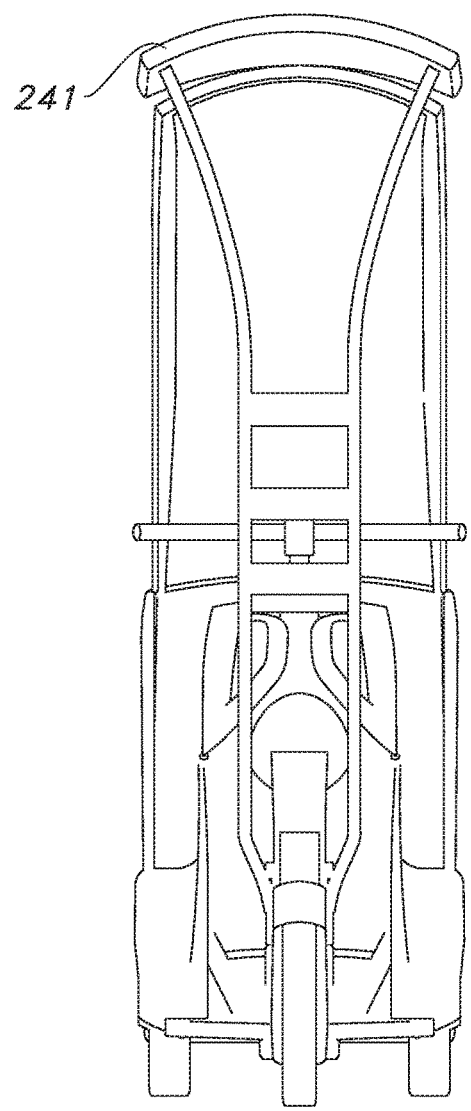
FIG. 22 is a rear view of the example of the AUTV depicted in FIG. 18 according to the present disclosure.

In an embodiment, the spring 140 is mounted to the deck 120 by brackets 142. As depicted in FIG. 7, the brackets 142 are clevis brackets, which are affixed to the deck 120 by bolts or other fasteners. Pins 144 project through the leaf spring 140 and engage the clevis pins 136 of the brackets 142 to prevent lateral movement of the leaf spring 140 with respect to the deck 120.

In an embodiment, the biasing mechanism 135 of the scooter 100 has a leaf spring 140. It is to be understood, however, that any number of springs and types of springs would be suitable for biasing the upper portion 114 to the vertical position. Other springs may include for example and without limitation: a helical spring, a die spring, a Belleville spring, an elastomeric spring, a gas spring, an extension spring, and/or a torsion bar.

The upper portion 114 of the articulated frame 102 is shown in a vertical upright orientation in FIGS. 1-8. The lower portion 116, in particular the deck 120, is shown in a substantially level orientation parallel to the ground. When making a turn, the upper portion 114 of the articulated frame 102 of the scooter 100 tilts to the left or right. The tilting mechanism in examples of the present disclosure may be active or passive. The tilting mechanism depicted in examples shown in FIGS. 1-17 and 24-39 are controlled by the user while riding the AUTV. As such, when the examples of the AUTV depicted in FIGS. 1-17 and 24-39 are operated automatically, or by remote control, the upper portion 114, 314 remains upright. The center of gravity of the unoccupied AUTV is low enough to avoid having the inside wheel lift from inertia-induced roll at normal operating speeds. In some embodiments, the speed and rate of turn may be automatically controlled in automatic and remote modes to prevent inertia induced wheel lift in turns. The upper portion 114 of the articulated frame 102 of the scooter 100 is shown tilting to the left in FIGS. 9-17. It is to be understood that only the upper portion 114 of the articulated frame 102 tilts. The deck 120 maintains a substantially level orientation parallel to the ground.

In operation of the AUTV, the user rests the feet of the user (not shown) on the deck 120, holds onto handlebar 154, and sits on seat 158. When making a turn, the upper portion 114 tilts and the steerer tube 115 rotates to the left or right. As with riding a bicycle, the user may cause the upper portion 114 to tilt by shifting the user's weight slightly left or right of the center. Also like riding a bicycle, in some embodiments, counter-steering may be used to initiate tilting and turning. However, unlike a bicycle, embodiments of the present disclosure are biased by the biasing mechanism 135 to return to an upright position. A bicycle will tend to fall over when the user no longer applies balancing forces. Embodiments of the present disclosure are stable, and tend to return to an upright position when forces that cause tilting are removed. Thus, the AUTV of the present disclosure can be automatically or remotely operated without falling over and without having a user to keep the upper portion 114 upright, while still having the benefits of being able to tilt when desired by a user mounted on the AUTV for riding. Tilting promotes the comfort of the user by counteracting inertial forces that result from the turn. Tilting also counteracts some of the weight shift on the rear wheels 112 that would otherwise occur during a turn even though the lower portion 116 remains parallel to the ground. During a turn, the user's body leans to the left or right with the upper portion 114 and the steering axis 159. The user's feet, however, remain in a level orientation with the deck 120. Thus, the orientation of the deck 120 is fixed with respect to the orientation of the ground. In some embodiments, only the upper portion 114 tilts.

At the end of the turn, the user straightens out the front wheel 110 and causes the upper portion 114 to return to an upright position. The biasing force produced by the spring 140 assists the user in restoring the upper portion to the upright position. Moreover, the biasing force of the spring 140 also inhibits the user from falling off the scooter 100. That is, the handlebar 154 pushes the user toward a position directly over the deck 120, thereby helping the user to stay upright on the scooter 100. In addition, the static orientation of the deck 120 ensures that the deck 120 can sit low, close to the ground, which is convenient for users that cannot step up very high and may have difficulty with balance.

In embodiments as disclosed herein, the articulated frame 102 with hinge 118 may be applied on a four-wheeled AUTV as well as three-wheeled scooters also disclosed herein.

In some embodiments, as depicted in FIGS. 32A-39, the AUTV of the present disclosure is a scooter 300 with an articulated frame 302. The example of the scooter 300 depicted in FIGS. 32A-39 is a tricycle 304 which includes a front wheel 310, rear wheels 312, a handlebar 354, and a seat 358. The handlebar 354 includes user controls including a throttle control (not shown in FIGS. 32A-39) and a front brake lever 308.

In embodiments as depicted in FIGS. 32A-39, a steering control module housing 361 is located near the top of the head tube 352 on the rearward side facing the seat 358. The steering control module housing 361 may contain a steering control motor 398 that is connected to the steerer tube 315 by a drive belt. In an example, the drive belt may have cogs defined thereon for engaging complementary structures, for example splines, on the steerer tube 315. A Light Detection and Ranging (LIDAR) unit 345 is mounted on the head tube 352 on the forward side opposite the steering control module housing 361.

In embodiments of the present disclosure, the articulated frame 302 includes an upper portion 314 and lower portion 316 that are connected via a hinge 318. The upper portion 314 includes various structural members such as a main beam 350, a down tube 351, a head tube 352, and a seat tube 356. The main beam 350, down tube 351, seat tube 356, and head tube 352 are rigidly affixed to one another. The main beam 350 is connected to the lower portion 316 at hinged joints. The upper portion 314 is rotatable about a tilt axis 326. The rotation of the upper portion 314 about the tilt axis 326 is independent of a camber of the rear wheels 312. The tilt axis 326 is longitudinal with respect to the AUTV 10.

In the example depicted in FIGS. 32A-39, a fork 313 includes an arch 307 rigidly attached to the stanchion tubes 311. In the example depicted in FIGS. 32A-39 a disc brake may be connected to the front wheel 310. The disc brake can have a cross-drilled rotor 321 attached to the front wheel 310 to rotate with the front wheel 310.

In embodiments, as depicted in FIGS. 32A-39, the head tube 352 is rigidly connected to the down tube 351. The head tube 352 defines a steering axis 359. A steerer tube 315 is rotatably disposed in the head tube 352 to rotate about the steering axis 359. The steerer tube 315 is connected to the arch 307 of the fork 313 for rotation therewith. The handlebar 354 is connected to the steerer tube 315 for rotation therewith. The down tube 351 is rigidly affixed to the main beam 350. The seat tube 356 is rigidly affixed to the main beam 350. A seat 358 is attached to the seat tube 356. In the example depicted in FIGS. 32A-39, the seat tube 356 defines a semi-circular portion 347 (See FIG. 35) with a center 346 located below the seat 358.

Figure 33A:
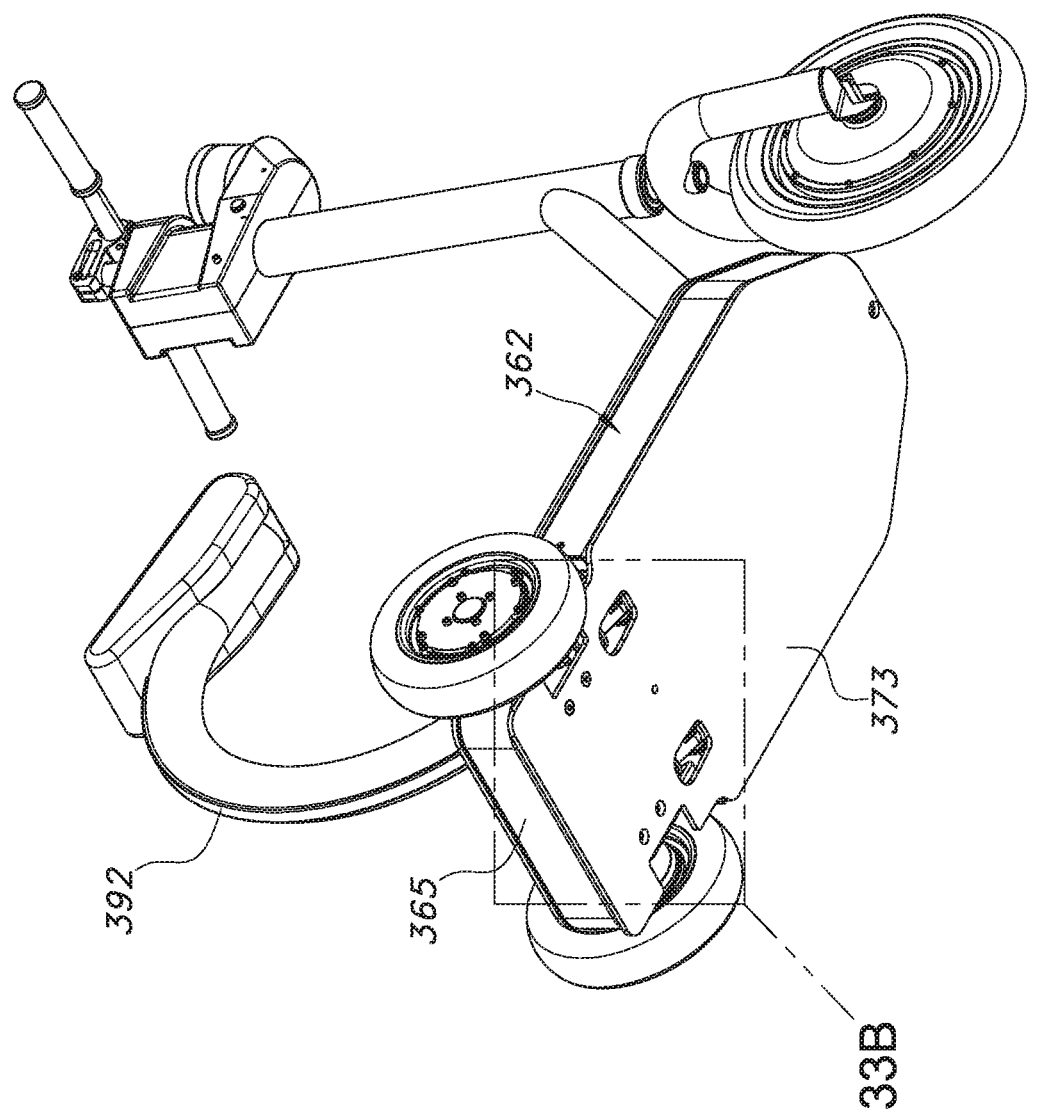
FIG. 33A is a lower right rear perspective view of the example of the AUTV depicted in FIG. 32A with the belly pan removed according to the present disclosure.

In embodiments, the lower portion 316 may include a lower subframe 362. A left frame rail 363 and a right frame rail 364 are located on opposite sides of the lower subframe 362. A rear transverse cross-member 365 connects the left frame rail 363 and the right frame rail 364 at the rear ends of the frame rails 363, 364. A front transverse cross-member 366 connects the left frame rail 363 and the right frame rail 364 at the front ends of the frame rails 363, 364. The left frame rail 363 and a right frame rail 364 may be parallel to each other, however, a portion of the lower subframe 362 may be narrower at the front end as depicted in FIG. 33A. The left frame rail 363 and the right frame rail 364 may have any suitable cross-section, for example the left frame rail 363 and the right frame rail 364 may be boxed frame members, c-shaped frame members, hat frame members or combinations thereof. Members of the lower subframe 362, e.g., the left frame rail 363, the right frame rail 364, front transverse cross-member 366, and rear transverse cross-member 365 may be rigidly joined, for example by welding or by brackets and fasteners, or by combinations of welding, brackets, and fasteners. A belly pan 373 is depicted in FIG. 33A attached to a bottom side of the lower subframe 362 facing the road surface.

Figure 32A:
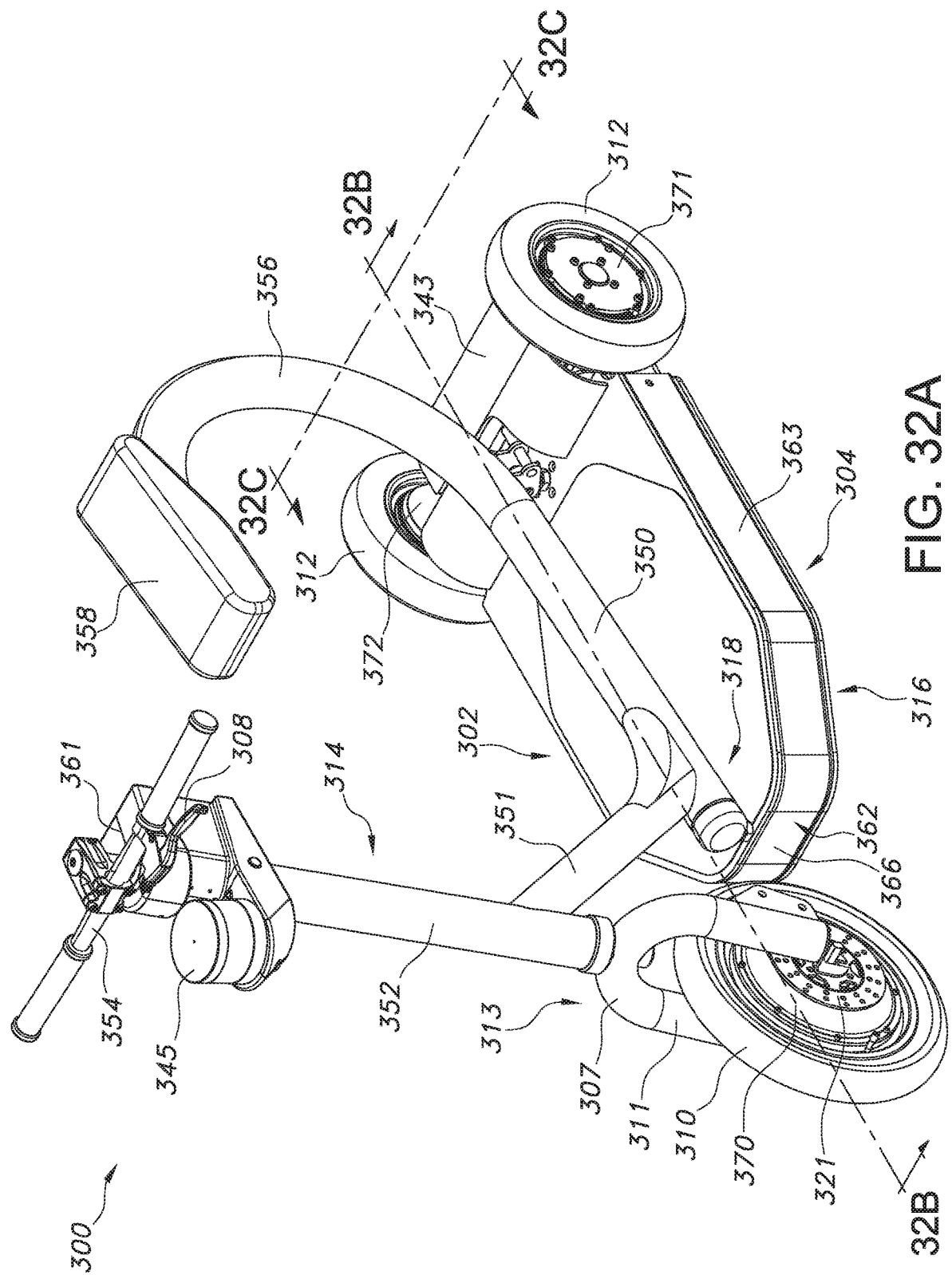
FIG. 32A is a left upper front perspective view of an example of an AUTV according to the present disclosure.
Figure 32B:
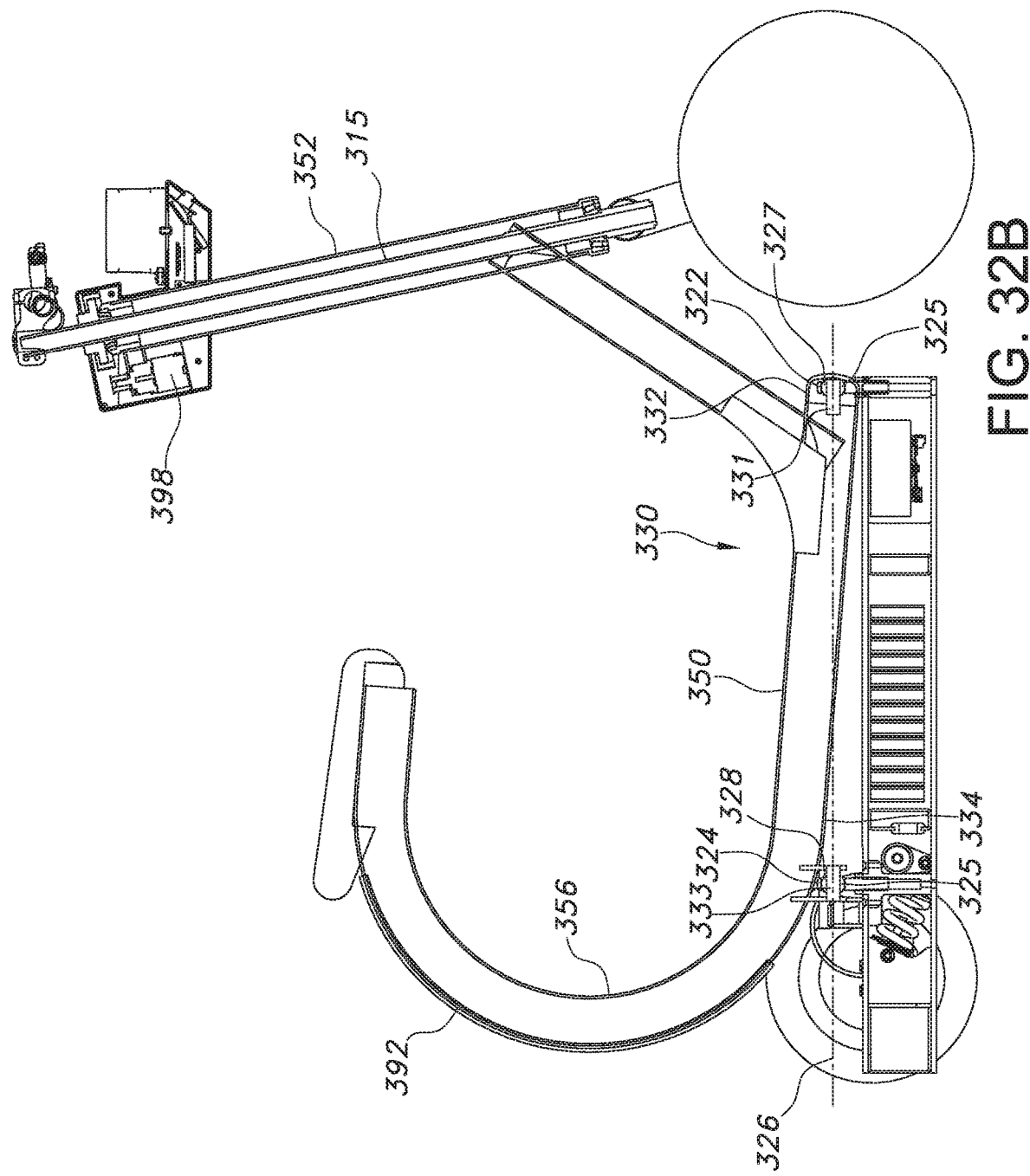
FIG. 32B is a section view taken as indicated in FIG. 32A depicting the tilt axis of the upper portion of the articulated frame of the AUTV depicted in FIG. 32A according to the present disclosure.
Figure 32C:
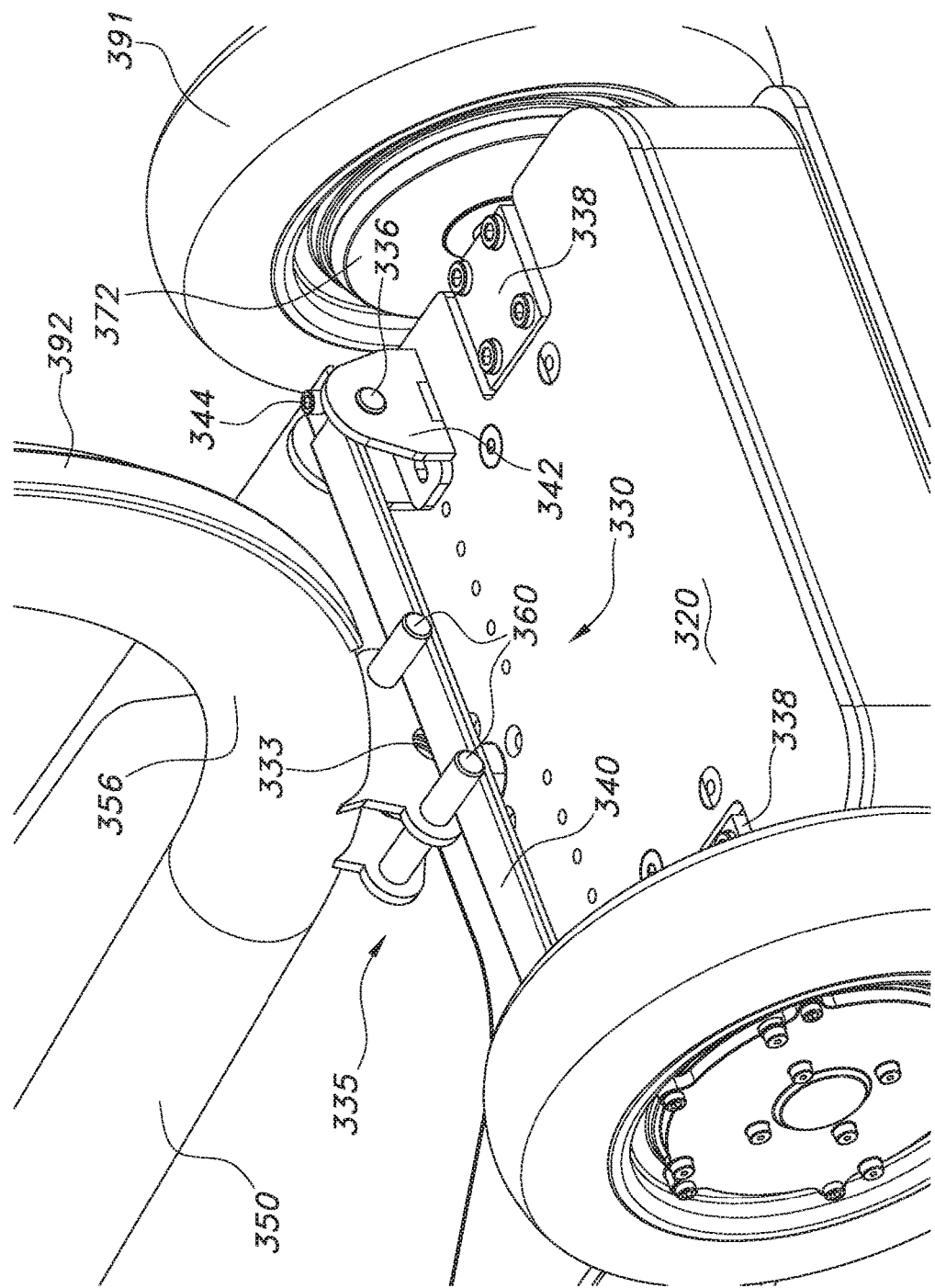
FIG. 32C is a detail view taken as indicated in FIG. 32A depicting the biasing mechanism of the articulated frame of the AUTV depicted in FIG. 32A according to the present disclosure.
Figure 33B:
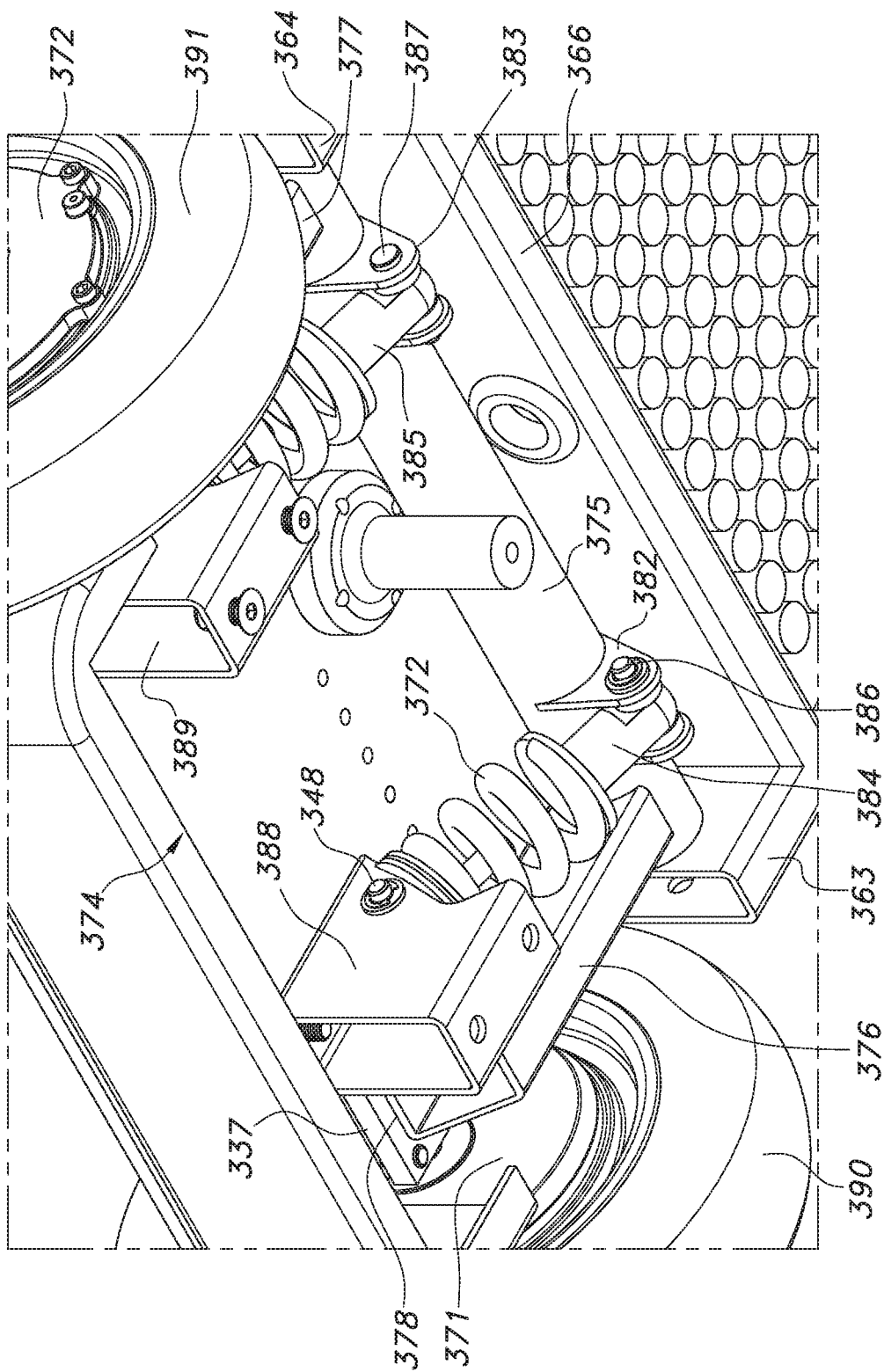
FIG. 33B is a detail view taken as indicated in FIG. 33A depicting an example of a rear suspension system of the AUTV depicted in FIG. 32A with the belly pan removed according to the present disclosure.
Figure 35:
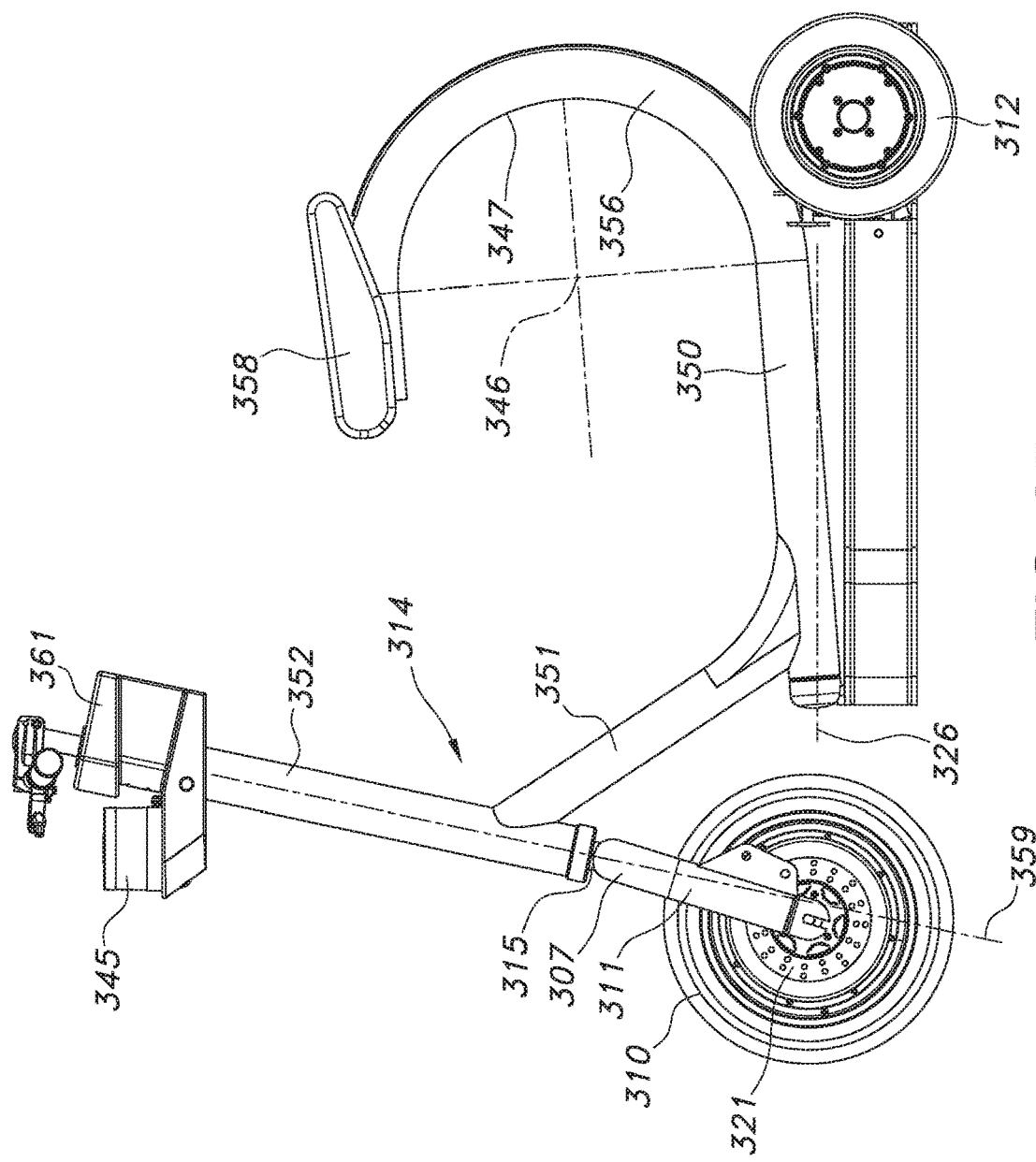
FIG. 35 is a left side view of the example of the AUTV depicted in FIG. 32A according to the present disclosure.
Figure 34:
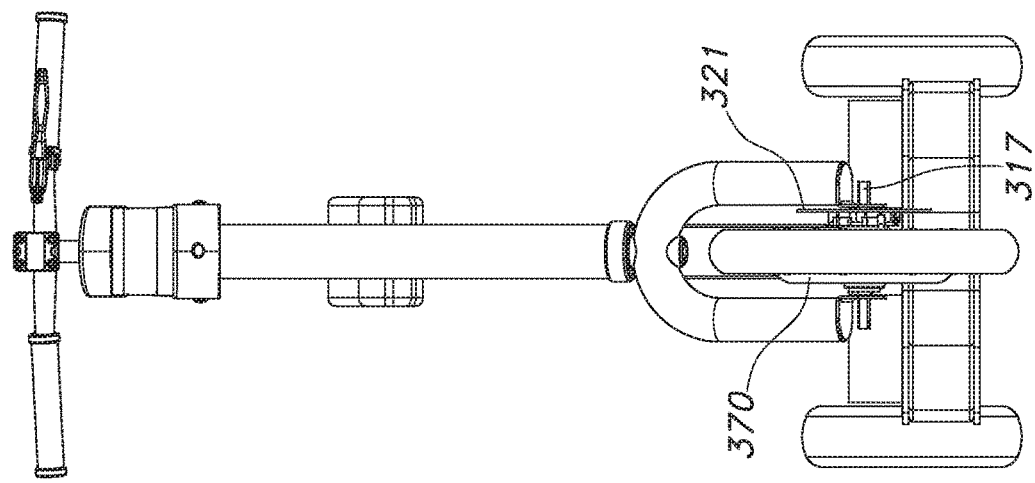
FIG. 34 is a front view of the example of the AUTV depicted in FIG. 32A according to the present disclosure.
Figure 37:
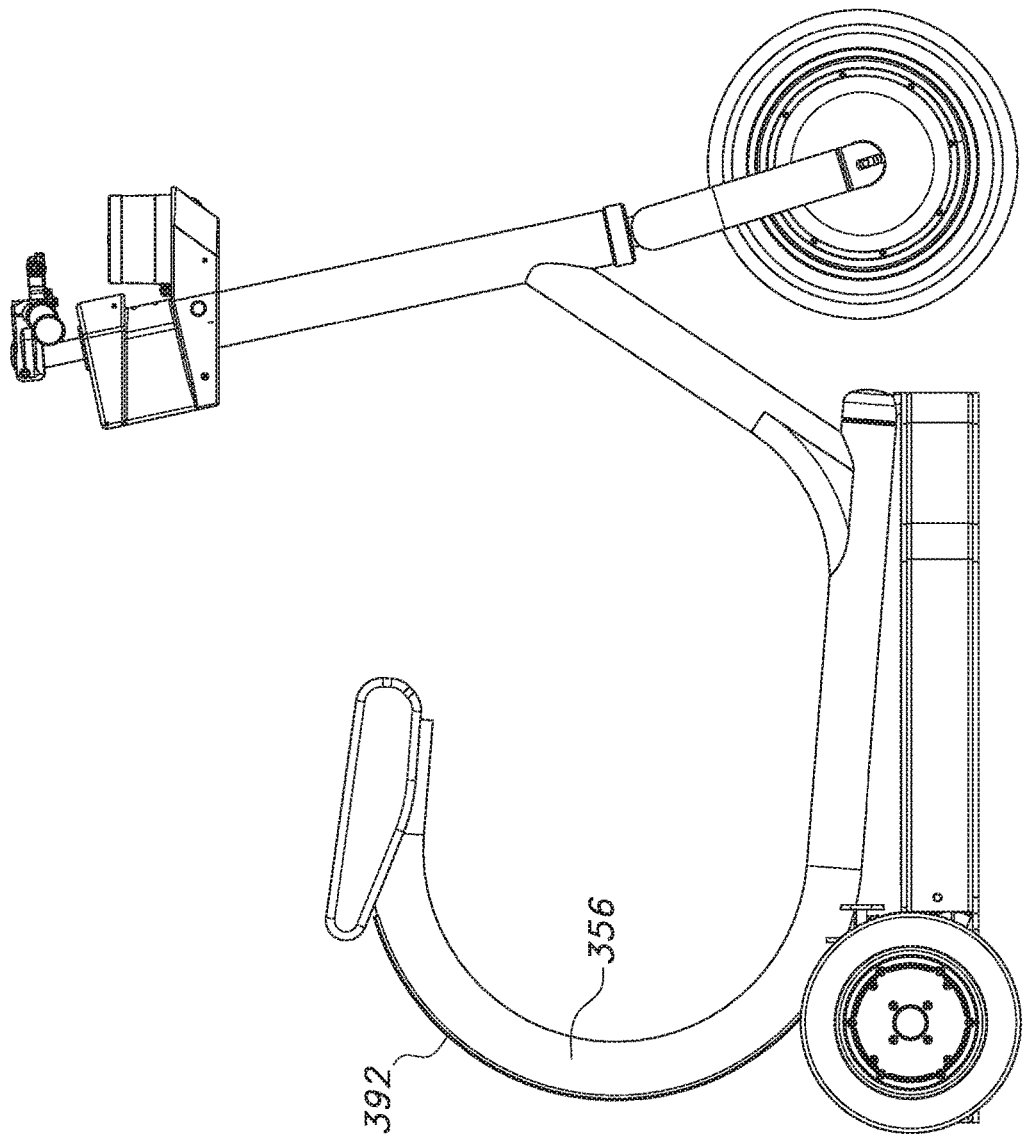
FIG. 37 is a right side view of the example of the AUTV depicted in FIG. 32A according to the present disclosure.

In embodiments, the lower portion 316 of the articulated frame 302 can have a deck 120 and rear wheels 312 attached thereto. In embodiments as depicted in FIGS. 32A-39, the rear wheels 312 are attached to the lower portion 362 via a rear suspension system 374. The rear suspension system 374 is best seen in FIG. 33B. The rear suspension system 374 includes a twist-beam 375 attached to the left frame rail 363 and to the right frame rail 364 via bushings (not shown) wherein the bushings allow rotation of the twist-beam 375. A left trailing arm 376 is rigidly attached to the twist-beam 375, extending rearward. An axle clamp bracket 337 is rigidly attached at a rearward end 378 of the left trailing arm 376. A left rear stub axle 380 projects from the left hub motor 371 and is affixed to the left trailing arm 376 by the axle clamp bracket 337. A left crank arm 382 extends radially from the twist-beam 375. The left crank arm 382 is rigidly attached to the twist-beam 375. A left spring assembly 384 is rotatably connected to the left crank arm 382 via a left spring pin 386. The radial line through a center axis of the twist-beam 375 and a center axis of the left spring pin 386 is at a rotation angle of between 45 and 100 degrees about the twist-beam 375. The left crank arm 382 generally extends rearward and downward relative to the scooter 300. A left spring anchor 388 is rigidly attached to the deck 320. The left spring assembly 384 is rotatably attached to the left spring anchor 388 by an anchor pin 348. The left spring assembly 384 is to urge the left rear wheel 390 downward via the left crank arm 382, twist-beam 375, and left trailing arm 376. The left spring assembly 384 may be preloaded to prevent the scooter 300 from sagging on the suspension when lightly loaded.

The rear suspension system 374 is generally a mirror image of itself from left to right. A right trailing arm 377 is rigidly attached to the twist-beam 375, extending rearward. An axle clamp bracket 337 is rigidly attached at a rearward end of the right trailing arm 377. A right rear stub axle 381 projects from the right hub motor 372 and is affixed to the right trailing arm 377 by the axle clamp bracket 337. A right crank arm 383 extends radially from the twist-beam 375. The right crank arm 383 is rigidly attached to the twist-beam 375. A right spring assembly 385 is rotatably connected to the right crank arm 383 via a right spring pin 387. The radial line through a center axis of the twist-beam 375 and a center axis of the right spring pin 387 is at a rotation angle of between 45 and 100 degrees about the twist-beam 375. The right crank arm 383 generally extends rearward and downward relative to the scooter 300. A right spring anchor 389 is rigidly attached to the deck 320. The right spring assembly 385 is rotatably attached to the right spring anchor 389 by an anchor pin 348. The right spring assembly 385 is to urge the right rear wheel 391 downward via the right crank arm 383, twist-beam 375, and right trailing arm 377. The right spring assembly 385 may be preloaded to prevent the scooter 300 from sagging on the rear suspension system 374 when lightly loaded. The left spring assembly 384 and the right spring assembly 385 may include coil springs, and/or shock absorbers.

In the embodiment depicted in FIGS. 32A-39, a forward hinge knuckle 322 and a rear hinge knuckle 324 are rigidly attached to the lower portion 316. A forward hinge aperture 327 is defined by the forward hinge knuckle 322. A rear hinge aperture 328 is defined by the rear hinge knuckle 324. The forward hinge aperture 327 and the rear hinge aperture 328 define the tilt axis 326. The hinge knuckles 322, 324 are rigidly affixed to the deck 120. Together, the forward hinge knuckle 322, the rear hinge knuckle 324 and the main beam 350 form a hinge 318 that enables rotation of the upper portion 314 of the articulated frame 302 with respect to the lower portion 316 about the tilt axis 326. In an embodiment, the hinge 318 further includes bearing assemblies 325 to reduce friction. In an embodiment as depicted in FIGS. 32A-39, the bearing assemblies 325 include rod-end bearings.

In embodiments, a forward spindle 331 is attached to the main beam 350 at a forward end 332 of the main beam 350. The forward spindle 331 defines the tilt axis 326. A rear spindle 333 is attached at a rear end 334 of the main beam 350 distal to the forward end 332 of the main beam 350. As depicted in FIG. 32B, the rearward end of the main beam 350 is located where the straight portion of the main beam 350 transitions to the curved portion of the seat tube 356. The rear spindle 333 defines the tilt axis 326 along with the forward spindle 331.

The hinge 318 can also include a biasing mechanism 335 to bias the upper portion 314 of the frame in a vertical orientation. In embodiments, as depicted in FIGS. 32A-39, the biasing mechanism 335 includes a leaf spring 340 affixed to the deck 320 and rigid arms 360 affixed to the main beam 350. As depicted in FIG. 32C, the rigid arms 360 are pins affixed by brackets at the bottom of the seat tube 356 which is rigidly affixed to the main beam 350. When the upper portion 314 of the articulated frame 302 of the scooter 300 is tilting for a turn, for example, the upper portion 314 of the articulated frame 302 is made to tilt to one side, thus causing an arm 360 to rotate down onto the leaf spring 340. The more the upper portion 314 tilts, the more the arm 360 depresses the leaf spring 340. The leaf spring 340, therefore, provides a corrective force to assist the user to restore the orientation of the scooter 300 to its upright position when transitioning from the turn back to straight motion.

In an embodiment, the leaf spring 340 is mounted to the deck 320 by brackets 342. As depicted in FIG. 32C, the brackets 342 are clevis brackets, which are affixed to the deck 320 by bolts or other fasteners. Pins 344 project through the leaf spring 340 and engage the clevis pins 336 of the brackets 342 to prevent lateral movement of the leaf spring 340 with respect to the deck 320.

The upper portion 314 of the articulated frame 302 is shown in a vertical upright orientation in FIGS. 32A-39. The lower portion 316, in particular the deck 320, is shown in a substantially level orientation parallel to the ground. When making a turn, the upper portion 314 of the articulated frame 302 of the scooter 300 tilts to the left or right. The tilting mechanism of examples of the present disclosure may be active or passive.

Figure 36:
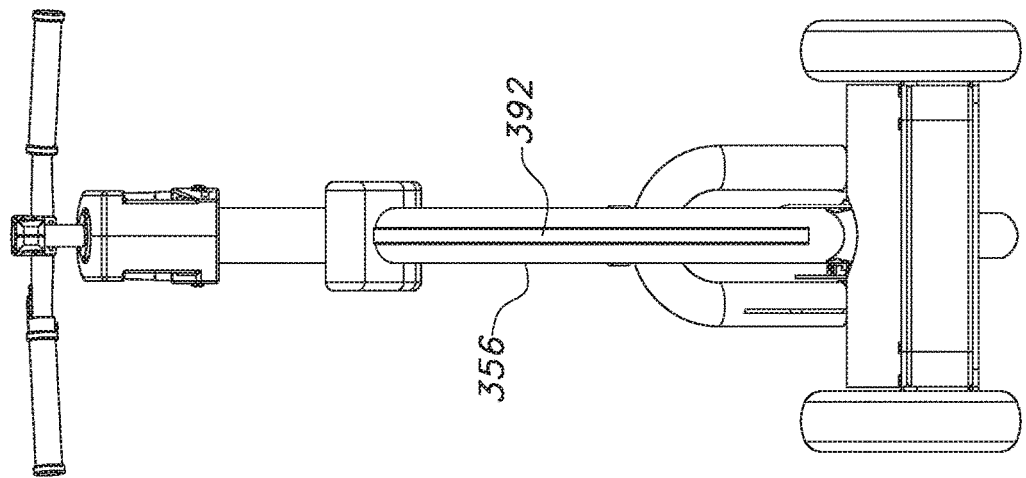
FIG. 36 is a rear view of the example of the AUTV depicted in FIG. 32A according to the present disclosure.
Figure 39:
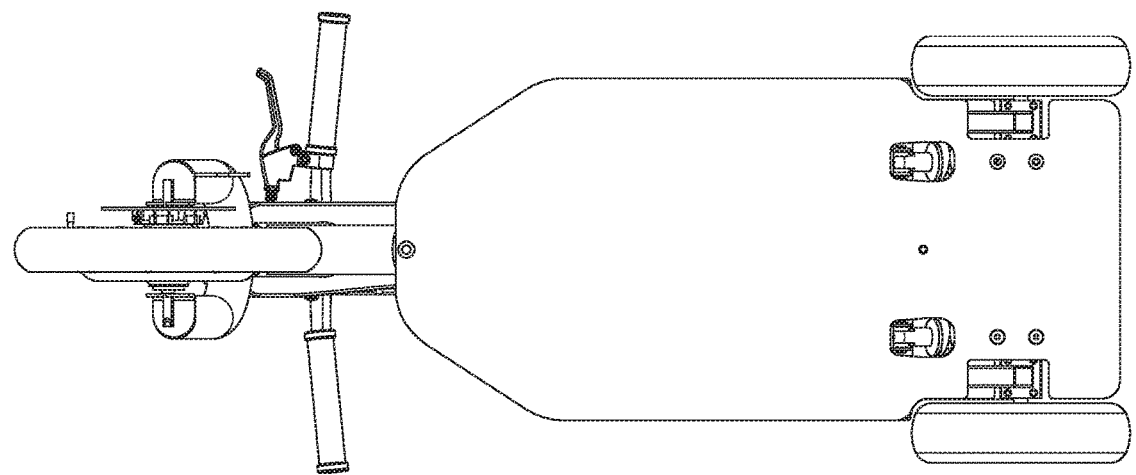
FIG. 39 is a bottom view of the example of the AUTV depicted in FIG. 32A according to the present disclosure.
Figure 38:
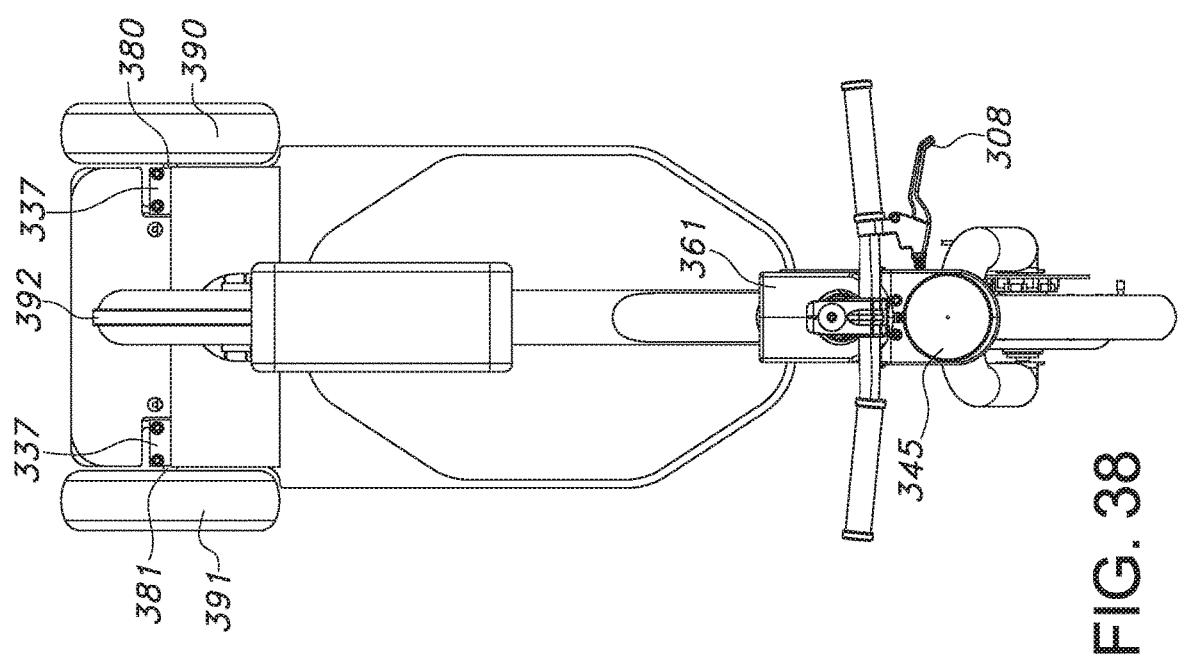
FIG. 38 is a top view of the example of the AUTV depicted in FIG. 32A according to the present disclosure.

In embodiments, as depicted in FIG. 36, a light emitting diode (LED) strip 392 is attached to the seat tube 356. The LED strip 392 is to blink in patterns to visually inform observers that have a view of the LED strip 392. For example, a portion of the LED strip 392 may be used as a red brake light to indicate that a brake has been activated. A portion of the LED strip 392 may be used as a red taillight to enhance the visibility of the AUTV when the AUTV is operated in low light or fog. Individual LEDs in the LED strip 392 may blink in any desirable sequence or pattern, and in any color, and at any intensity permissible according to rules, standards, and customs in the location in which the AUTV is operated.

In embodiments, as depicted in FIGS. 18-22, is an autonomous urban transport vehicle (AUTV) 20 for moving people in a fast and efficient manner through urban neighborhoods. In embodiments, the AUTV 20 includes a tricycle 204 to carry one passenger. The tricycle 204 includes a body 201, a frame 219 with uprights 239, and a combined windshield/roof 296 to protectively cover the passenger/operator being transported through a metropolitan area. The body includes a front cowling 249, front fenders 253, and a rear fender 255. A transparent or tinted windshield/roof 296 may be attached above the front cowling 249 between the uprights 239. A photovoltaic solar panel 241 may be mounted above the highest part of the windshield/roof 296 and attached to the highest points of the uprights 239. A headlamp 297 may be mounted on the front cowling 249 to illuminate the path ahead of the AUTV 20. Embodiments of the AUTV 20 may further include a seat 258, a steering mechanism including a handlebar 254, and at least one pedal (not shown) for controlling acceleration and braking. Two drive wheels 212 are forward of the seat 258 and independently driven by electric motors implementing electric differential steering. Electric differential steering as used herein means steering control in which drive wheels on opposite sides of a vehicle are rotated at different speeds to turn the AUTV. The rear wheel 295 may be a swiveling caster wheel that swivels in response to the electric differential steering. In embodiments, the drive wheels 212 and the rear wheel 295 have airless tires 257. It is to be understood that pneumatic tires may be used in place of the airless tires 257. A user interface includes a touch-screen display (not shown) configured to control various functions and settings of the AUTV 20.

The handlebar 254 is connected to a steering column 293, which is in turn supported by steering support brackets 294 that are attached above the front cowling 249.

The AUTV 20 is configured to transport a person short distances in urban areas using green energy sources. In an embodiment, the AUTV 20 includes an autonomous mode in which the AUTV is configured to autonomously drive to a location when hailed by a passenger, and then revert to a manual mode of operation when the passenger/operator steps into/onto the AUTV 20. In the manual mode, the passenger controls the direction, speed, and braking of the AUTV 20. The automatic mode, and the manual mode to some extent, are implemented with an AUTV controller 600.

Figure 23:
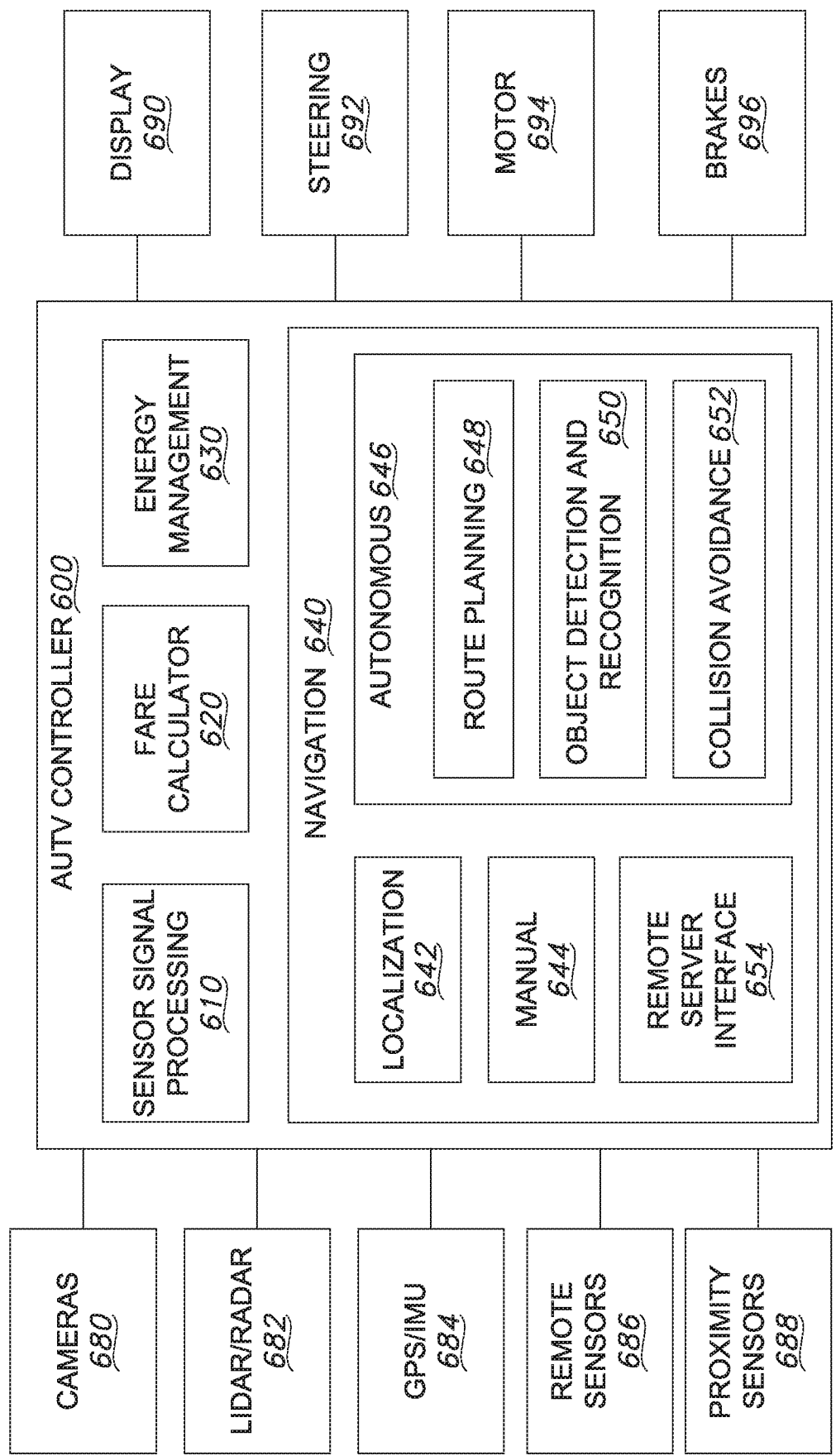
FIG. 23 is a functional block diagram of an example of a controller of the example of the AUTV depicted in FIG. 18 according to the present disclosure.
Figure 24:
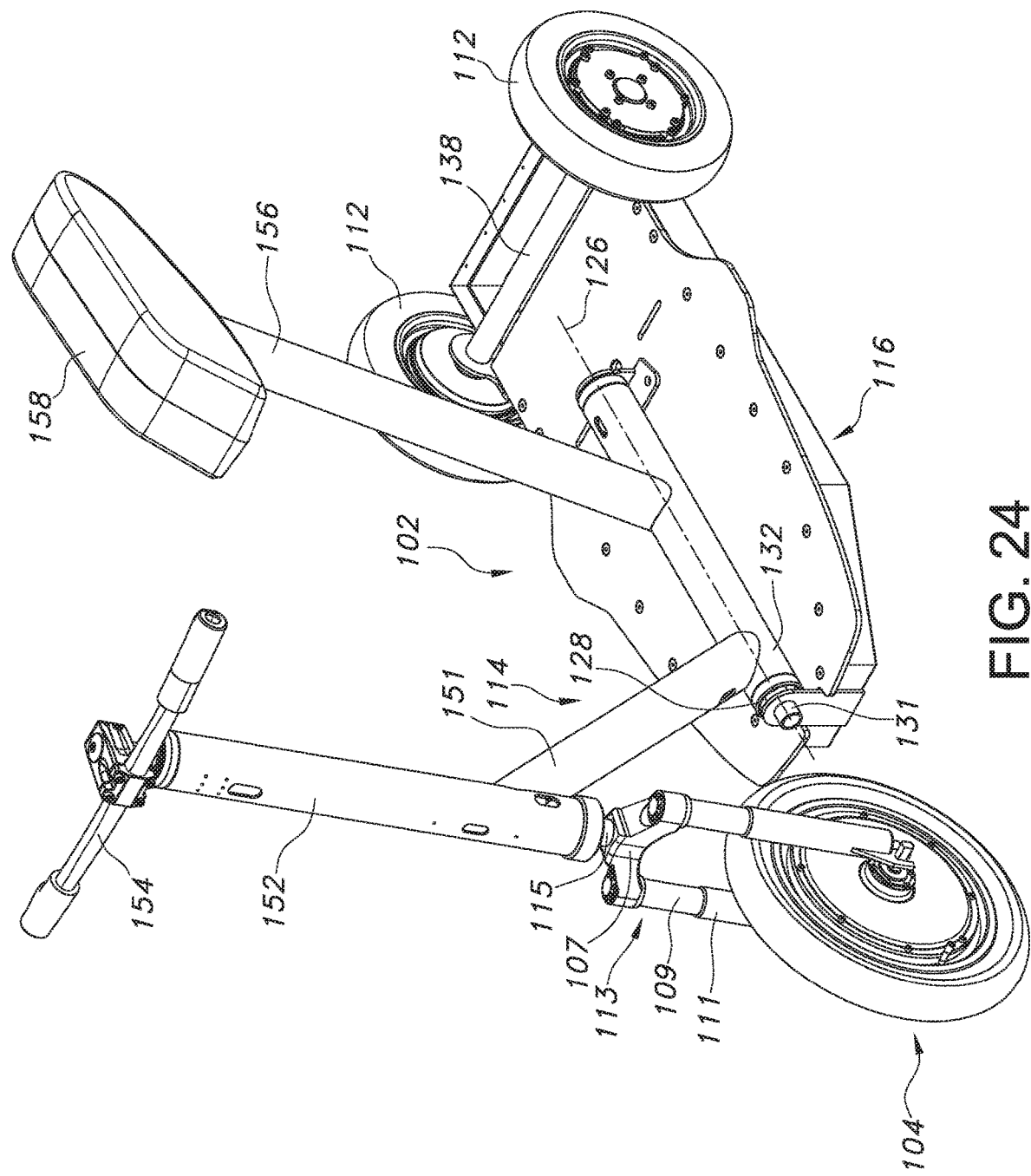
FIG. 24 is a left upper front perspective view of an example of an AUTV according to the present disclosure.

FIG. 23 is a functional block diagram of an example of an AUTV controller 600. The AUTV controller 600 includes a sensor signal processor 610, fare calculator 620, energy management 630, and navigation processor 640. The sensor signal processor 610 effectively synthesizes the incoming stream of data to construct a representation of the landscape, and then use that representation to identify the roadways, traffic lights and signage, and avoid obstacles including pedestrians. The representation of the landscape is preferably constructed from an incoming data streams transmitted by a plurality of sensors including one or more cameras 680, LIDAR/radar 682, global positioning system/inertial measurement unit (GPS/IMU) 684, remote sensors 686, including traffic cameras and other AUTVs, for example, and/or proximity sensors 688, including ultrasonic and (time of flight) TOF systems for example.

The fare calculator 620 is configured to determine the amount charged to the passenger for transporting the passenger to a destination. This charge may include a fee for hailing the AUTV to a rendezvous location as well as a fee for the "taxi" service which is calculated based on distance traveled or elapsed time, for example.

The energy management system 630 is configured to monitor battery power consumption and schedule times and locations to recharge on-board batteries. In some embodiments, recharging involves autonomously driving to a "home" location where the AUTV is placed on a charger. In other embodiments, recharging involves driving to a location where on-board solar panels can collect sunlight.

The navigation processor 640 is configured to perform path planning and, depending on the mode, autonomously drive the AUTV. The navigation processor 640 includes a localization processor 642, a manual mode processor 644, and an autonomous mode processor 646. The localization processor 642 is configured to keep track of the physical location of the AUTV at all times. Although the position may be determined from GPS much of the time, the localization processor 642 may also determine location based on images and triangulation when the AUTV loses the GPS satellite signal when indoors, for example.

The manual mode processor 644 may be configured to guide the passenger to their intended destination while the passenger is operating the AUTV. This may involve recommending to the passenger/operator which streets to use and when and where to turn. The recommended route may be presented to the user via an LCD display 690. In the manual mode, the AUTV may also provide alerts for potholes, car doors opening, dangerous intersections, etc. based on input from sensors that scan the environment for situations of concern and alert the user via sound, vibration, steering feedback, or display. In the manual mode, however, the AUTV does not control the brakes or the steering.

The autonomous mode processor 646 is configured to autonomously "drive" the AUTV when there is no passenger to assume control of the AUTV. At a high level, autonomous driving generally involves route planning 648, obstacle detection and recognition 650, and collision avoidance 652. Route planning 648 is reliant on the input from the sensor signal processor 610, but may also rely on historical "driving" data when determining when and where to drive the AUTV. Object detection and recognition 650 generally involves recognition of roads, signage, lights, cars and pedestrians, potholes, car doors opening, and intersections with a higher probability of crashes or traffic jams, etc. Collision avoidance 652 is configured to prioritize the interests of the passenger, other drivers, pedestrians, people using the roads and/or sidewalks by operating the AUTV in compliance with motor vehicle regulations, alerting the passenger, applying brakes, and/or steering to avoid collisions. The output of the autonomous mode processor 646 includes a plurality of signals for controlling the graphical information presented to the user via an LCD display 690, a steering actuator 692, a drive motor 694, and brakes 696, for example.

In some embodiments, the navigation processor 640 further includes an interface for communicating with a remote server 654 that provides up-to-date traffic information, for example, or municipal road restrictions.

The AUTV in an embodiment is configured to automatically transition between the autonomous mode and manual mode depending on whether a person is on the AUTV. If a person steps onto the AUTV, the one or more sensors detect the presence of the person and the controller 600 reverts to the manual mode. When the person steps off the AUTV, the sensors detect the absence of the person and the controller 600 reverts to the autonomous mode. This set of sensors may include an outward-facing camera(s) feeding a recognition system 650 that sees a person enter the AUTV, an inward-facing camera feeding a recognition system that can identify when a person has entered the AUTV, weight sensors configured to detect force exerted by a person on the seat or floorboards, and/or pressure sensors for detecting a person's hands on the steering bar, for example.

In embodiments, the AUTV disclosed herein further includes an autonomous positioning processor for automatically driving the AUTV, when available, to locations at which there is a higher probability of acquiring a paying passenger. When the passenger encounters the AUTV, the passenger can step on the AUTV and drive it away for a fee.

The autonomous positioning processor maintains a record of when and where paying passengers stepped onto the AUTV as well as the elapsed time between arrival at the location and acquisition of the passenger. Over time, the AUTV constructs a map of locations and times at which the elapsed times are minimal. The AUTV may then position itself at those locations in order to find passengers and maximize revenue. The AUTV of the present disclosure is advantageously configured to autonomously drive to those locations.

In addition, the autonomous positioning processor may download or empirically learn bus terminal locations and schedules, train terminal locations and schedules, business locations and schedules, movie theater locations and showtimes, which are then correlated with the maps in order to optimize positioning of the AUTV when available. In this manner, the AUTV can anticipate needs of users and be waiting at locations it is needed when people disembark a bus, train or other transportation devices, leave work, or leave a movie theater, for example. That is, the AUTV can dispatch itself in advance of demand to increase utilization rates. In some embodiments, the maps may be constructed from data gathered from a plurality of AUTVs.

An aspect provided herein includes an autonomous urban transport vehicle (AUTV) 10 to transport a user, comprising: a tricycle 104 including brakes and steering; a controller 600 including: an autonomous mode processor 646 to control the brakes and steering when the AUTV 10 is in an autonomous mode; and a manual mode processor 644 to control manual mode functions of the AUTV 10 when the AUTV 10 is in a manual mode, wherein the manual mode functions are exclusive of actuation of the brakes 696 and steering 692. In embodiments, the controller 600 further comprises a fare calculator 620 to determine a price for a ride. In embodiments, the controller 600 further comprises an energy management processor 630 to maintain sufficient energy storage in batteries and to schedule recharging activities. In embodiments, the controller 600 reverts to the manual mode processor 644 when the user mounts the AUTV 10, and reverts to the autonomous mode processor 646 when the user dismounts the AUTV 10. In embodiments, the AUTV 10 further comprises a set of sensors configured to detect when the user mounts or dismounts the AUTV 10. In embodiments, the set of sensors comprises an outward-facing camera feeding an image recognition system to determine that the user has entered the AUTV 10, an inward-facing camera feeding the image recognition system to determine that the user has entered the AUTV 10, a weight sensor configured to detect force exerted by the user on a seat or floorboard, and/or a pressure sensor for detecting a user's hand.

An aspect provided herein includes an autonomous urban transport vehicle (AUTV) comprising: an autonomous positioning processor for automatically driving the AUTV 10, when the AUTV 10 is available, from a present location to a better location wherein the AUTV 10 has a higher probability of acquiring a paying passenger at the better location than a present location.

An aspect provided herein includes an autonomous urban transport vehicle (AUTV) system comprising: a fare calculator 620; and a demand estimator, wherein the AUTV 10 operates the fare calculator 620 in conjunction with the demand estimator to incentivize trips that end near a demand rich area.

An aspect provided herein includes an autonomous urban transport vehicle (AUTV) system comprising a controller 600 to determine a state of compliance with an ordinance of a jurisdiction in which an AUTV 10 is located. In embodiments, the controller 600 is to automatically operate the AUTV 10 or to restrict manual operation of the AUTV 10 according to rules based on the ordinance of the jurisdiction in which the AUTV 10 is located. In embodiments, the ordinance includes a parking ordinance that applies to the AUTV 10 after a completion of a ride. In embodiments, the AUTV system is to notify a driver of a non-compliance with the ordinance.

An aspect provided herein includes an autonomous urban transport vehicle (AUTV) system wherein the AUTV system is to notify a driver of a feature mapped by an other AUTV system. In embodiments, the feature includes a hazard or a congested traffic area.

An aspect provided herein includes an autonomous urban transport vehicle (AUTV) comprising: an articulated frame 102 including: an upper portion 114 having a main beam 150, a down tube 151, a seat tube 156 and a head tube 152 rigidly affixed together; a lower portion 116 having a deck 120 and rear wheels 112 attached thereto; wherein the main beam 150 is connected to the lower portion 116 at hinged joints wherein the main beam 150 is rotatable about a tilt axis 126, wherein the rotation of the main beam 150 about the tilt axis 126 is independent of a camber of the rear wheels 112, wherein the tilt axis 126 is longitudinal with respect to the AUTV 10. In embodiments, the head tube 152 is rigidly connected to the down tube 151, wherein the head tube 152 defines a steering axis 159, wherein a steerer tube 115 is rotatably disposed in the head tube 152 to rotate about the steering axis 159, wherein a handlebar 154 is connected to the steerer tube 115 for rotation therewith, wherein the down tube 151 is rigidly affixed to the main beam 150, wherein the seat tube 156 is rigidly affixed to the main beam 150, and wherein a seat 158 is attached to the seat tube 156. In embodiments, the AUTV 10 is a tricycle 104 having a single front wheel 110 and two rear wheels 112 disposed aft of the single front wheel 110. In embodiments, the single front wheel 110 has a front hub motor disposed in the single front wheel 110 for selectively applying drive torque and regenerative braking to the single front wheel 110. In embodiments, two rear wheels 112 include a left rear wheel 390 and a right rear wheel 391, wherein a left hub motor 371 is disposed in the left rear wheel 390 for selectively applying drive torque and regenerative braking to the left rear wheel 390, and wherein a right hub motor 372 is disposed in the right rear wheel 391 for selectively applying drive torque and regenerative braking to the right rear wheel 391. In embodiments, the AUTV is a quadricycle having two front wheels and two rear wheels 112 disposed aft of the two front wheels.

In embodiments, the AUTV 10 further comprises: a forward hinge knuckle 122 and a rear hinge knuckle 124 rigidly attached to the lower portion 116; a forward hinge aperture defined by the forward hinge knuckle 122; and a rear hinge aperture 128 defined by the rear hinge knuckle 124, wherein the forward hinge aperture and the rear hinge aperture 128 define the tilt axis 126. In embodiments, the forward hinge knuckle 122 comprises a forward pillow block bearing assembly 129' and the rear hinge knuckle 124 comprises a rear pillow block bearing assembly 129. In embodiments, the rear hinge knuckle 124 comprises a rod end bearing. In embodiments, the AUTV 10 further comprises: a forward spindle 131 attached to the main beam 150 at a forward end 132 of the main beam 150 wherein the forward spindle 131 defines the tilt axis 126; and a rear spindle 133 attached at a rear end 134 of the main beam 150 distal to the forward end 132 of the main beam 150, wherein the rear spindle 133 defines the tilt axis 126. In embodiments, the AUTV 10 further comprises a biasing mechanism 135 to urge the upper portion 114 toward a center configuration wherein the AUTV 10 is in the center configuration when the down tube 151 and the seat tube 156 define an upright plane that is normal to a line extending through the rotational centers of the rear wheels 112. In embodiments, the biasing mechanism 135 includes a spring 140 to urge the upper portion 114 toward the center 346 configuration. In embodiments, the spring 140 is a leaf spring 140 attached to the lower portion 116, wherein the upper portion 114 includes a left eccentric arm 160 affixed to the main beam 150 to engage the leaf spring 140 and to increasingly energize the leaf spring 140 as a tilt angle increases to the left, wherein the upper portion 114 includes a right eccentric arm 160 affixed to the main beam 150 opposite the left eccentric arm to engage the leaf spring 140 and to increasingly energize the leaf spring 140 as the tilt angle increases to the right, wherein the left eccentric arm is to disengage the leaf spring 140 when the tilt angle is positive to the right, wherein the right eccentric arm is to disengage the leaf spring 140 when the tilt angle is positive to the left. In embodiments, the AUTV 10 further comprises: a left bracket 142 to mount a left end of the leaf spring 140 to the deck 120; a right bracket 142 to mount a right end of the leaf spring 140, distal to the left end of the leaf spring 140, to the deck 120; and a pin 144 is located through a complementary aperture defined in the leaf spring 140, wherein the pin is further to engage the left bracket or the right bracket to laterally fix the leaf spring 140 with respect to the deck. In embodiments, the spring is a torsion spring. In embodiments, the spring is a helical spring. In embodiments, the spring is an elastomeric spring. In embodiments, the spring is a Belleville spring.

An autonomous urban transport vehicle (AUTV) platform for providing mobility through urban neighborhoods. In embodiments, the AUTV platform further comprises a notification system for providing notifications to platform users. In embodiments, the notification may be sent to the user when the AUTV 10 arrives. For example, the notification may be via an app or SMS text message to update the user when the AUTV 10 is available to ride. In embodiments, the AUTV platform further comprises a mobile application for accessing the platform via a mobile device. In embodiments, the AUTV platform further comprises a communication system for enabling communication between platform entities. In embodiments, the AUTV platform further comprises an application programming interface for enabling access to the platform. In embodiments, the AUTV platform further comprises a software development kit. In embodiments, the AUTV platform further comprises a system for enabling remote control of the AUTV 10. In embodiments, the AUTV platform further comprises an alerts system for providing alerts to passengers of the AUTV 10. In the manual mode, the AUTV 10 may provide an alert for potholes, car doors opening, statistically dangerous intersections, etc. The AUTV 10 may have an array of sensors that can be used for autonomous operation. In manual operation, the array of sensors may be to scan the environment for potential situations of concern and alert the user via sound, vibration, steering feedback, or display.

An aspect provided herein includes an autonomous urban transport vehicle (AUTV) to provide mobility through urban neighborhoods, comprising: a solar charging system; and an alternative energy system for providing energy to the AUTV 10. In embodiments, the alternative energy system is an electric charging system. In embodiments, the alternative energy system is of a fuel-based system.

An aspect provided herein includes an autonomous urban transport vehicle (AUTV 10) to provide mobility through urban neighborhoods, comprising a machine vision system. In embodiments, the machine vision system is to identify a location of the AUTV 10. In embodiments, the location of the AUTV 10 is indoors. In embodiments, the machine vision system is to identify a user that requested the AUTV. For example, the machine vision system may be used in biometric authentication. In embodiments, the machine vision system is to identify a user hailing location. In embodiments, the machine vision system is to enable collision avoidance. In embodiments, the machine vision system is to identify businesses or landmarks on a route. In embodiments, the machine vision system is integrated with an advertising system. In embodiments, the AUTV 10 is integrated with an advertising system.

An aspect provided herein includes an autonomous urban transport vehicle (AUTV) to provide mobility through urban neighborhoods, comprising a cargo system for carrying items. In embodiments, the AUTV 10 further comprises a lockable cargo system for securely carrying items. In examples, the lockable cargo system can include a lock box with a lock mechanism. The lock box can be accessed by a user and by a vendor for purposes of delivering goods to the user. The lock mechanism can be independent of an unlock mechanism. Locking and unlocking can be done via an app, a web interface, SMS or other remote communication. The lockable cargo system can transmit lock/unlock commands securely to the AUTV 10. In embodiments, the lockable cargo system includes a remote locking and unlocking system. In embodiments, the lockable cargo system includes a biometrics-based locking and unlocking system. In embodiments, the lockable cargo system has a system for locking and unlocking that is based upon detecting a mobile phone identification number.

An aspect provided herein includes an autonomous urban transport vehicle (AUTV) platform to provide mobility through urban neighborhoods, comprising a system for integrating with a delivery system. In embodiments, the delivery system is to leverage a cargo box of the AUTV 10. The delivery system may leverage the cargo box by, for example, heating or cooling the cargo box. The delivery system may leverage the cargo box by, for example, charging a fee to use the cargo box.

An aspect provided herein includes an autonomous urban transport vehicle (AUTV) platform to provide mobility through urban neighborhoods, having a navigation and routing system integrated with a delivery scheduling and routing system or using information from a delivery scheduling and routing system.

An aspect provided herein includes an autonomous urban transport vehicle (AUTV 10) platform to provide mobility through urban neighborhoods, having a rewards and incentives system for rewarding platform users for a desired behavior. In embodiments, the desired behavior is recharging the AUTV 10. In embodiments, the rewards and incentives system is to reward platform users for sharing information related to a ride on a social networking system. In embodiments, the rewards and incentives system has a loyalty points system for rewarding users with loyalty points for platform usage-related behavior. In embodiments, the rewards and incentives system is to reward platform users for desired driving behaviors. In embodiments, the desired behavior is a desired passenger behavior. In embodiments, the AUTV platform comprises a probabilistic positioning system for determining a location having a higher probability of acquiring a paying passenger than a present location, wherein the rewards and incentives system is to reward platform users for taking rides on vehicles that are relocating via the probabilistic positioning system.

An aspect provided herein includes an autonomous urban transport vehicle (AUTV) platform to provide mobility through urban neighborhoods, having a hailing system for enabling a user to request a vehicle. In examples, an AUTV 10 may arrive autonomously when a ride is requested. A scooter can be hailed or scheduled using an app that matches a request with an available AUTV 10. A central system can be used to dispatch an available AUTV 10 to the user. In embodiments, the hailing system determines a user hailing location by analyzing a photo or video captured by a user device. Thus, the hailing system may precisely locate the rendezvous point. Some current systems ride-hailing systems are limited to GPS resolution of position. The hailing system of the present disclosure allows a user to convey a precise location by using one or more photos taken from the location.

An aspect provided herein includes an autonomous urban transport vehicle (AUTV) platform to provide mobility through urban neighborhoods, having a scheduling system for enabling a user to schedule the use of a vehicle connected to the platform. In embodiments, the hailing system determines a vehicle location by analyzing a photo or video captured by a user device. The location of the user or the AUTV 10 can be determined from photos. Photos taken from the user position can be compared to a reference database of images. The comparison establishes the position of the user at the time the photo was captured. Video images from the AUTV 10 can be used to converge to the user position. Photos may provide more accurate localization information than GPS. GPC/GPS convergence can be 10 meters or worse. Photo/Photo convergence can shrink the error area by a factor of 10,000 (0.1 meter).

An aspect provided herein includes an autonomous urban transport vehicle (AUTV) platform to provide mobility through urban neighborhoods, comprising a convergence system for determining a rendezvous location for a platform user and a vehicle connected to the platform. Instead of providing a precise location for a rendezvous point, a more general meeting area may be targeted and the AUTV 10 and user may converge to a rendezvous point to reduce wait time. The convergence system will guide the AUTV 10 along a path shown to the user. The convergence system will offer the user a path that will intersect the AUTV path. The convergence system wherein both the AUTV 10 and the user move toward one another results in faster convergence. In embodiments, the rendezvous location is indoors. In embodiments, the AUTV platform further comprises a machine vision system to determine indoor position. In embodiments, the rendezvous location is outdoors.

An aspect provided herein includes an autonomous urban transport vehicle (AUTV) platform to provide mobility through urban neighborhoods, having a navigation and routing system for configuring vehicle routes. In embodiments, the AUTV routes include an indoor route segment. In some examples, an AUTV 10 can get closer to a customer than an automobile by driving indoors. Without relying on any legal theory, it is believed that, in some instances, an AUTV 10 may have a form that for certain users can be considered a mobility assistance device and be authorized to offer indoor transportation assistance. In embodiments, the AUTV platform has a system for downloading route segment restriction information from a municipal system. The AUTV 10 can be configured to download and abide by road restrictions, for example, by including a road on a blacklist or a whitelist and with related time-of-day restrictions. Road restrictions can be based on regular municipal constraints or can be dynamically updated from an operation center of the AUTV platform. Information can come from a schedule downloaded from a municipal server. Updates to the municipal server may be observed by the platform and updates can be relayed to the AUTV 10 as needed for the current position and intended route of the AUTV 10. A digital map of useable roads may be updated in real-time. The AUTV 10 and the operations center are connected via a telemetry link that allows for real-time updates of maps that influence vehicle constraints in either autonomous or manual mode. In embodiments, the AUTV platform further comprises a system for scheduling downloads of route segment restriction information from a municipal system. In embodiments, the AUTV platform further comprises a system for generating a blacklist for route segments. In embodiments, the AUTV platform further comprises a system for generating a whitelist for route segments.

An aspect provided herein includes an autonomous urban transport vehicle (AUTV) to provide mobility through urban neighborhoods, having a navigation system that leverages a machine vision system.

An aspect provided herein includes an autonomous urban transport vehicle (AUTV) platform to provide mobility through urban neighborhoods, having a visualization system for providing visualizations related to platform entities. In embodiments, the information related to platform entities is overlaid on a map.

An aspect provided herein includes an autonomous urban transport vehicle (AUTV) platform to provide mobility through urban neighborhoods, having a visualization system for providing visualizations related to a progress of a vehicle along a route.

An aspect provided herein includes an autonomous urban transport vehicle (AUTV) platform to provide mobility through urban neighborhoods, having a dashboard system for providing analytic overlay information on a map in order to enable a configuration of parameters of a fleet of vehicles.

An aspect provided herein includes an autonomous urban transport vehicle (AUTV) platform to provide mobility through urban neighborhoods, having a machine learning or artificial intelligence system for automating decisions. In embodiments, the decisions are related to fleet deployment. In embodiments, the decisions are related to fleet utilization. In embodiments, the decisions are related to fleet positioning.

An aspect provided herein includes an autonomous urban transport vehicle (AUTV) platform to provide mobility through urban neighborhoods, having a predictive maintenance system for predicting maintenance events for platform vehicles. In embodiments, the AUTV platform has a maintenance scheduling system for scheduling a maintenance event.

An aspect provided herein includes an autonomous urban transport vehicle (AUTV) platform to provide mobility through urban neighborhoods, having an energy management system for managing energy of platform vehicles.

An aspect provided herein includes an autonomous urban transport vehicle (AUTV) to provide mobility through urban neighborhoods, having a solar charging system for capturing, storing, and using solar energy. In embodiments, the AUTV platform further has a system for identifying and using roads with direct sunlight on the roads. In embodiments, the AUTV has a system for detecting solar energy information measured by a vehicle. In embodiments, the AUTV platform further has a communication system for enabling communication between platform entities, wherein the communication system is leveraged to share solar energy information measured by vehicles. In embodiments, the AUTV platform having an alternative charging network for providing alternative energy to platform vehicles.

An AUTV 10 with a solar panel may be configured to identify and use roads with more sun exposure. The AUTV 10 can include a solar panel, and the AUTV 10 can record an amount of converted solar power. The AUTV 10 may include a video camera to estimate the locations where sunlight is occluded, for example by buildings, trees, signs, bridges, tunnels, or geological structures such as canyons, hills or mountains. The AUTV 10 of the present disclosure can determine an orientation of the solar panel relative to a direction of normal or direct solar radiation. The AUTV platform is to generate a map of the Sun by recording light levels as a function of time, date, and weather. The AUTV 10 is to record sun intensity while moving so as to develop maps of expected Sun exposure as a function of date, time and weather conditions. The Sun levels are to be shared by the AUTVs connected to the AUTV platform. Information from any one AUTV 10 can be relayed to a central location to develop accurate shared maps.

An aspect provided herein includes an autonomous urban transport vehicle (AUTV) platform to provide mobility through urban neighborhoods, having a probabilistic positioning system to determine optimal vehicle locations for platform vehicles. In embodiments, the AUTV platform has a system for relocating vehicles to the optimal vehicle locations determined by the probabilistic positioning system. In examples, the AUTV 10 is to learn train schedules and business schedules in order to find locations where people need transportation when the people disembark from the train, leave for lunch, or walk out of movie. The AUTV platform is to gather both ride data and published event data to anticipate ride needs. The AUTV platform is to dispatch the AUTVs in advance of demand to increase a utilization rate of the AUTVs.

An aspect provided herein includes an autonomous urban transport vehicle platform to provide mobility through urban neighborhoods, having a system for enabling sponsored rides. A user interface may allow the user to lookup free rides paid for by a business. The rides may be to a retail business or a restaurant, for example. The AUTV platform is to provide an interface that allows users to select starting points that may reduce a fare. The AUTV platform can include an interface that allows users to select routes that may reduce the fare.

An aspect provided herein includes an autonomous urban transport vehicle (AUTV) to provide mobility through urban neighborhoods, having a system for locking the AUTV 10. In embodiments, locking the AUTV 10 initiates a charging mechanism. In examples, a user can hold (reserve) an AUTV 10 to run an errand so the AUTV 10 will not rove away for a next customer. The user can use an interface on the AUTV 10 or on a user phone to suspend drive controls. While locked out (reserved) for future usage, the user may be charged at a lower rate than when the vehicle is not locked out (reserved).

An aspect provided herein includes an autonomous urban transport vehicle (AUTV) to provide mobility through urban neighborhoods, having a passenger detection system. In embodiments, passengers are detected by inward or outward-facing cameras. In embodiments, passengers are detected by weight or position sensors. The AUTV 10 automatically transitions between autonomous mode and manual mode depending on whether a user is on the AUTV 10. Detection of the passenger may be done via one or more sensor detections from the following: outward-facing cameras feeding a recognition system that sees the user enter the vehicle; inward-facing camera feeding a recognition system that can identify when a user has entered the AUTV 10; and weight and position sensors that detect a recognize a normal loading by a user. The transition from autonomous mode to the manual mode is to enable in-vehicle controls and disable autonomous and teleoperation control. The AUTV 10 is to revert to the manual mode when the user weight, or hand presence is sensed. An alternative or an enhancement to the vision-based detection of the user can be the seat weight or the hand force on the throttle or the brake grips.

An aspect provided herein includes an autonomous urban transport vehicle (AUTV) to provide mobility through urban neighborhoods, having an emergency management system for managing emergencies. In embodiments, the AUTV 10 has a system for automatically detecting and reporting emergency events to an emergency services system.

An aspect provided herein includes an autonomous urban transport vehicle to provide mobility through urban neighborhoods, having a playback system for enabling a presentation of audio content, video content, or other information related to a ride or route segment.

An aspect provided herein includes an autonomous urban transport vehicle (AUTV) to provide mobility through urban neighborhoods, having a system for detecting an underperforming vehicle driver/operator or other unwanted behavior and shutting down vehicle operation.

An aspect provided herein includes an autonomous urban transport vehicle (AUTV) platform to provide mobility through urban neighborhoods, having a fare calculation system for calculating an amount to charge for a passage of transporting a user to a destination.

An aspect provided herein includes an autonomous urban transport vehicle (AUTV) platform to provide mobility through urban neighborhoods, having a payment system for enabling payments related to vehicle rides.

An aspect provided herein includes an autonomous urban transport vehicle (AUTV) platform to provide mobility through urban neighborhoods, having a matching system for matching users and vehicles.

An aspect provided herein includes an autonomous urban transport vehicle (AUTV) platform to provide mobility through urban neighborhoods, having a system for generating a vehicle performance measure.

An aspect provided herein includes an autonomous urban transport vehicle (AUTV) platform to provide mobility through urban neighborhoods, having a system for enabling users to rate or review vehicles.

An aspect provided herein includes an autonomous urban transport vehicle (AUTV) platform to provide mobility through urban neighborhoods, having a system for detecting performance of a platform vehicle.

An aspect provided herein includes an autonomous urban transport vehicle (AUTV) platform to provide mobility through urban neighborhoods, having a system for dispatching a new vehicle to a user upon detection or reporting of a malfunctioning vehicle.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer-readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the processor may be a dual core processor, quad core processors, other chip-level multiprocessors and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as a secondary server, host server, distributed server and the like. The server may include one or more of memories, processors, computer-readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for the execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer-readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs. The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., universal serial bus (USB) sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another. The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various portions of methods identified and described above may be varied, and that the order of any one method may be adapted to particular applications of the techniques disclosed herein. All such variations and modifications are intended to fall within the scope of this disclosure. As such, the depiction and/or description of an order for various portions of the method should not be understood to require a particular order of execution, unless required by a particular application, or explicitly stated or otherwise clear from the context.

The methods and/or processes described above, and portions associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the portions thereof. In another aspect, the methods may be embodied in systems that perform the portions thereof and may be distributed across devices in a number of ways, or all of the functionality may be integrated into a dedicated, standalone device or other hardware. In another aspect, the means for performing the portions of the processes described above may include any of the hardware and/or software described above. All such permutations and combinations are intended to fall within the scope of the present disclosure. The method steps of the implementations described herein are intended to include any suitable method of causing such method steps to be performed, consistent with the patentability of the following claims unless a different meaning is expressly provided or otherwise clear from the context. For example, performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity and need not be located within a particular jurisdiction.

While the disclosure has been disclosed in connection with the many embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "set" is to be construed as a group having one or more members. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. It is understood that terms such as "first," "second," "third," "above," "below," and the like, are words of convenience and are not to be construed as implying a chronological order or otherwise limiting any corresponding element unless expressly stated otherwise. Furthermore, when "about" is utilized to describe a value, "about" is meant to encompass minor variations (up to +/−10%) from the stated value.

No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure. All documents referenced herein are hereby incorporated by reference.

Those skilled in the art may appreciate that numerous design configurations may be possible to enjoy the functional benefits of the inventive systems. Thus, given the wide variety of configurations and arrangements of embodiments of the present disclosure, the scope of the disclosure is reflected by the breadth of the claims below rather than narrowed by the embodiments described above.

What is claimed is:

1. An autonomous urban transport vehicle (AUTV) comprising:
    an articulated frame including:
        an upper portion having a main beam, a down tube, a seat tube and a head tube rigidly affixed together;
        a lower portion having a deck and rear wheels attached thereto; and
        a biasing mechanism to urge the upper portion toward a center configuration;
    wherein the AUTV is in the center configuration when the down tube and the seat tube define an upright plane that is normal to a line extending through rotational centers of the rear wheels;
    wherein the main beam is connected to the lower portion at hinged joints;
    wherein the main beam is rotatable about a tilt axis;
    wherein the rotation of the main beam about the tilt axis is independent of a camber of the rear wheels;
    wherein the tilt axis is longitudinal with respect to the AUTV;
    wherein the biasing mechanism includes a spring to urge the upper portion toward the center configuration;
    wherein the spring is a leaf spring attached to the lower portion;
    wherein the upper portion includes a left eccentric arm affixed to the main beam to engage the leaf spring and to increasingly energize the leaf spring as a tilt angle increases to the left;
    wherein the upper portion includes a right eccentric arm affixed to the main beam opposite the left eccentric arm to engage the leaf spring and to increasingly energize the leaf spring as the tilt angle increases to the right;
    wherein the left eccentric arm is to disengage the leaf spring when the tilt angle is positive to the right;
    and wherein the right eccentric arm is to disengage the leaf spring when the tilt angle is positive to the left.

2. The AUTV of claim 1 further comprising:
    a left bracket to mount a left end of the leaf spring to the deck;
    a right bracket to mount a right end of the leaf spring, distal to the left end of the leaf spring, to the deck; and
    a pin is located through a complementary aperture defined in the leaf spring, wherein the pin is further to engage the left bracket or the right bracket to laterally fix the leaf spring with respect to the deck.

* * * * *